United States Patent
Mori et al.

(10) Patent No.: US 9,213,217 B2
(45) Date of Patent: Dec. 15, 2015

(54) IMAGING APPARATUS FOR TAKING A PICTURE OF A DRIVER OF A MOTOR VEHICLE THROUGH A FRONT GLASS OF THE MOTOR VEHICLE

(75) Inventors: Yasuhiro Mori, Osaka (JP); Hideki Kawahara, Kyoto (JP); Mutsuhiro Yamanaka, Osaka (JP); Toshiharu Takenouchi, Osaka (JP); Eiji Nakamoto, Osaka (JP); Osamu Uesugi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 485 days.

(21) Appl. No.: 13/576,047

(22) PCT Filed: Feb. 23, 2011

(86) PCT No.: PCT/IB2011/000353
§ 371 (c)(1),
(2), (4) Date: Jul. 30, 2012

(87) PCT Pub. No.: WO2011/141780
PCT Pub. Date: Nov. 17, 2011

(65) Prior Publication Data
US 2012/0320218 A1    Dec. 20, 2012

(30) Foreign Application Priority Data

May 10, 2010    (JP) .................................. 2010-108417

(51) Int. Cl.
*H04N 5/33*    (2006.01)
*G03B 15/03*    (2006.01)
(Continued)

(52) U.S. Cl.
CPC    *G03B 15/03* (2013.01); *G03B 7/16* (2013.01); *H04N 5/2256* (2013.01); *H04N 5/2353* (2013.01); *H04N 5/2354* (2013.01)

(58) Field of Classification Search
USPC ....................... 348/370–371, 362–366, 221.1
See application file for complete search history.

(56) References Cited

U.S. PATENT DOCUMENTS 5,289,227 A *    2/1994    Kinjo ...................... G02B 7/28
                                                                355/77
5,440,368 A      8/1995    Momochi
(Continued)

FOREIGN PATENT DOCUMENTS

CN    101237530 A    8/2008
JP    02251941       10/1990
(Continued)

OTHER PUBLICATIONS

Chiba Takuya, Image Pickup Unit, Oct. 3, 2005, Sony Corp. Npl.*
(Continued)

*Primary Examiner* — Jefferey Harold
*Assistant Examiner* — Humam Satti
(74) *Attorney, Agent, or Firm* — Bacon & Thomas, PLLC

(57) ABSTRACT

Disclosed is an imaging apparatus provided with: a light irradiation unit which irradiates a target area with light; a differential image generation unit which generates a differential image between a first image which was taken in synchronization with the irradiation period during which the light irradiation unit irradiates the light and a second image which was taken outside the irradiation period; a transmittance estimation unit which estimates the light transmittance of an object in the target area; and a light exposure adjustment unit which adjusts the exposure based on the estimation result from the transmittance estimation unit. The transmittance estimation unit estimates the transmittance of the object from at least one of the first image, the second image, and the differential image.

10 Claims, 24 Drawing Sheets

(51) Int. Cl.
*H04N 5/225* (2006.01)
*H04N 5/235* (2006.01)
*G03B 7/16* (2014.01)

(56) References Cited

U.S. PATENT DOCUMENTS

| | | | |
|---|---|---|---|
| 7,826,735 B2 | 11/2010 | Yamaguchi | |
| 8,368,767 B2 | 2/2013 | Ogasawara et al. | |
| 2003/0043290 A1* | 3/2003 | Sasaki | H04N 5/23212 348/345 |
| 2003/0048375 A1 | 3/2003 | Seim | |
| 2005/0231740 A1* | 10/2005 | Uchino | H04N 1/6086 358/1.9 |
| 2006/0104539 A1* | 5/2006 | Kim | G06T 3/40 382/276 |
| 2007/0146539 A1 | 6/2007 | Kawahara et al. | |
| 2008/0008466 A1* | 1/2008 | Sasaki | G03B 15/05 396/164 |
| 2008/0068491 A1* | 3/2008 | Yuyama | H04N 5/235 348/362 |
| 2008/0165265 A1* | 7/2008 | Chiba | H04N 5/2354 348/308 |
| 2008/0181597 A1 | 7/2008 | Tamura | |
| 2008/0218714 A1* | 9/2008 | Uehara | G03F 7/70258 355/53 |
| 2009/0091650 A1* | 4/2009 | Kodama | H04N 5/232 348/333.11 |
| 2011/0227968 A1* | 9/2011 | Shimizu | G09G 3/342 345/690 |

FOREIGN PATENT DOCUMENTS

| | | |
|---|---|---|
| JP | 05127215 | 5/1993 |
| JP | H05-196989 | 8/1993 |
| JP | 11016100 | 1/1999 |
| JP | 2005065186 | 3/2005 |
| JP | 2006121617 | 5/2006 |
| JP | 2007225808 | 9/2007 |
| JP | 2008189148 | 8/2008 |
| JP | 2008306373 | 12/2008 |
| JP | 2009111656 | 5/2009 |
| JP | 2009-164951 | 7/2009 |
| JP | 2009212810 | 9/2009 |
| JP | 2009290519 | 12/2009 |
| JP | 201092353 | 4/2010 |
| TW | 201015994 | 4/2010 |
| WO | 03/023372 | 3/2003 |

OTHER PUBLICATIONS

English translation of the Taiwanese Search Report dated Aug. 27, 2014 issued in a corresponding Taiwanese application No. 100106226.

English translation of the Search Report of the Chinese Office Action issued on Nov. 15, 2014 in a corresponding Chinese application No. 201180007675.3.

An extended European Search Report dated Apr. 14, 2014 issued in a corresponding European application No. 11780275.1-1902.

International Search Report for PCT/IB2011/000353.

* cited by examiner

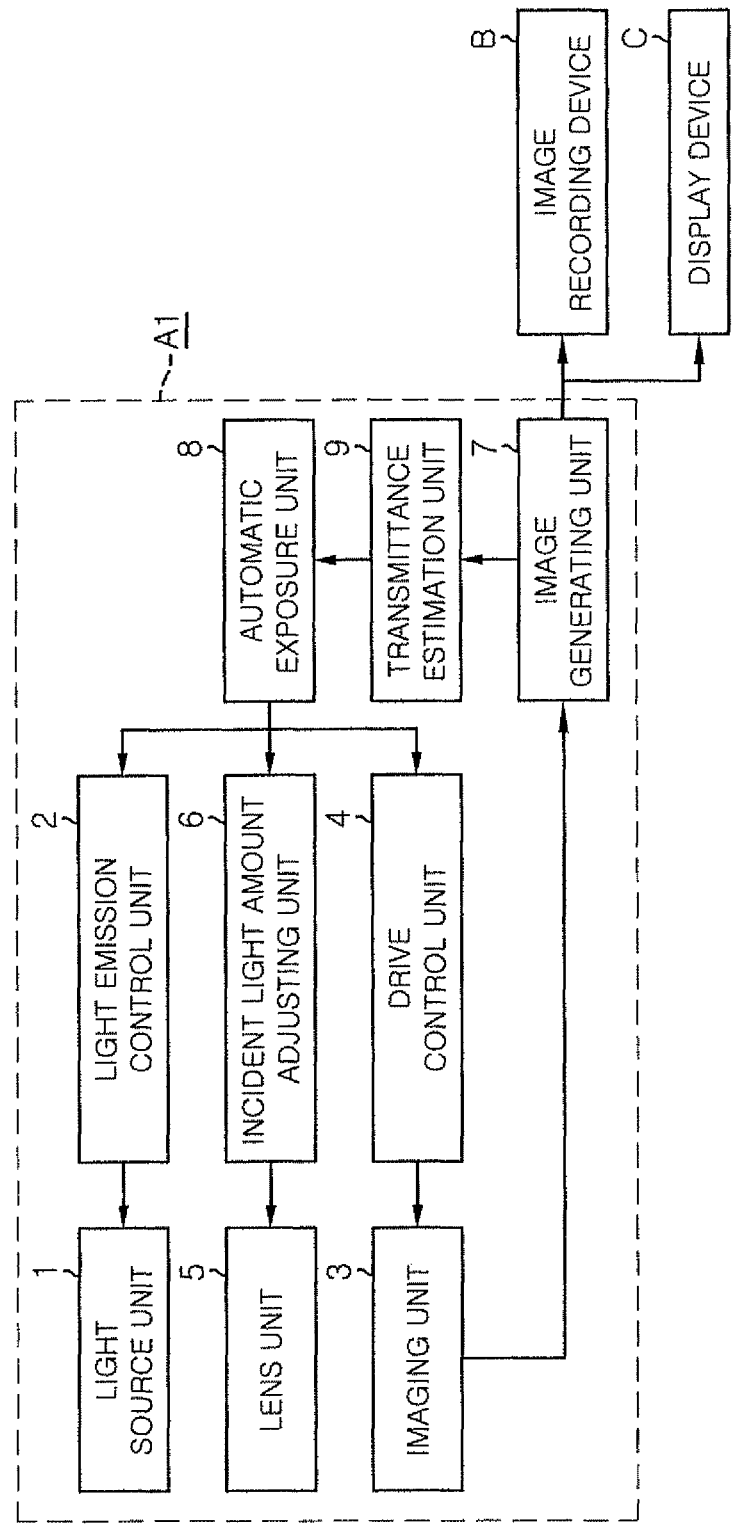

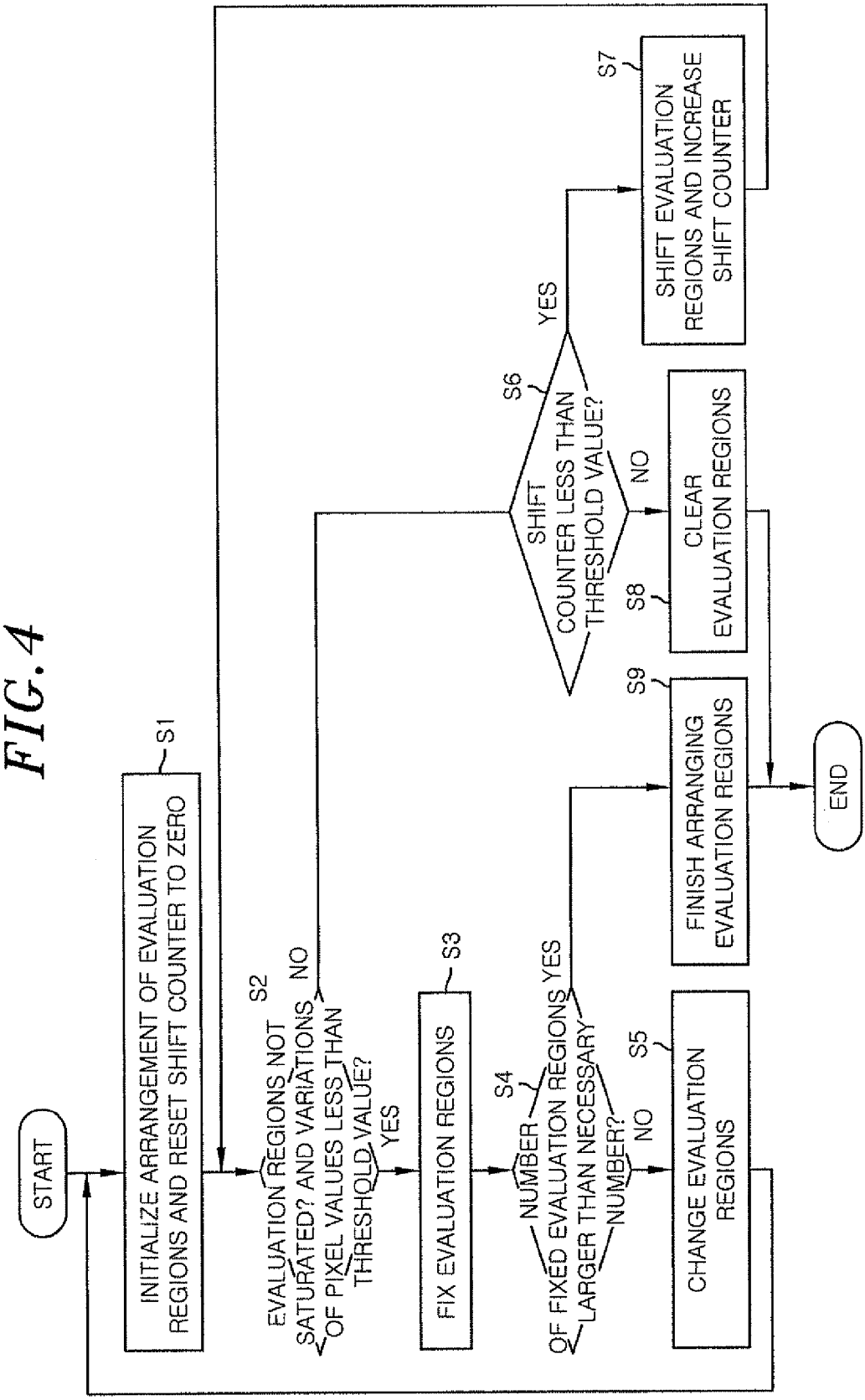

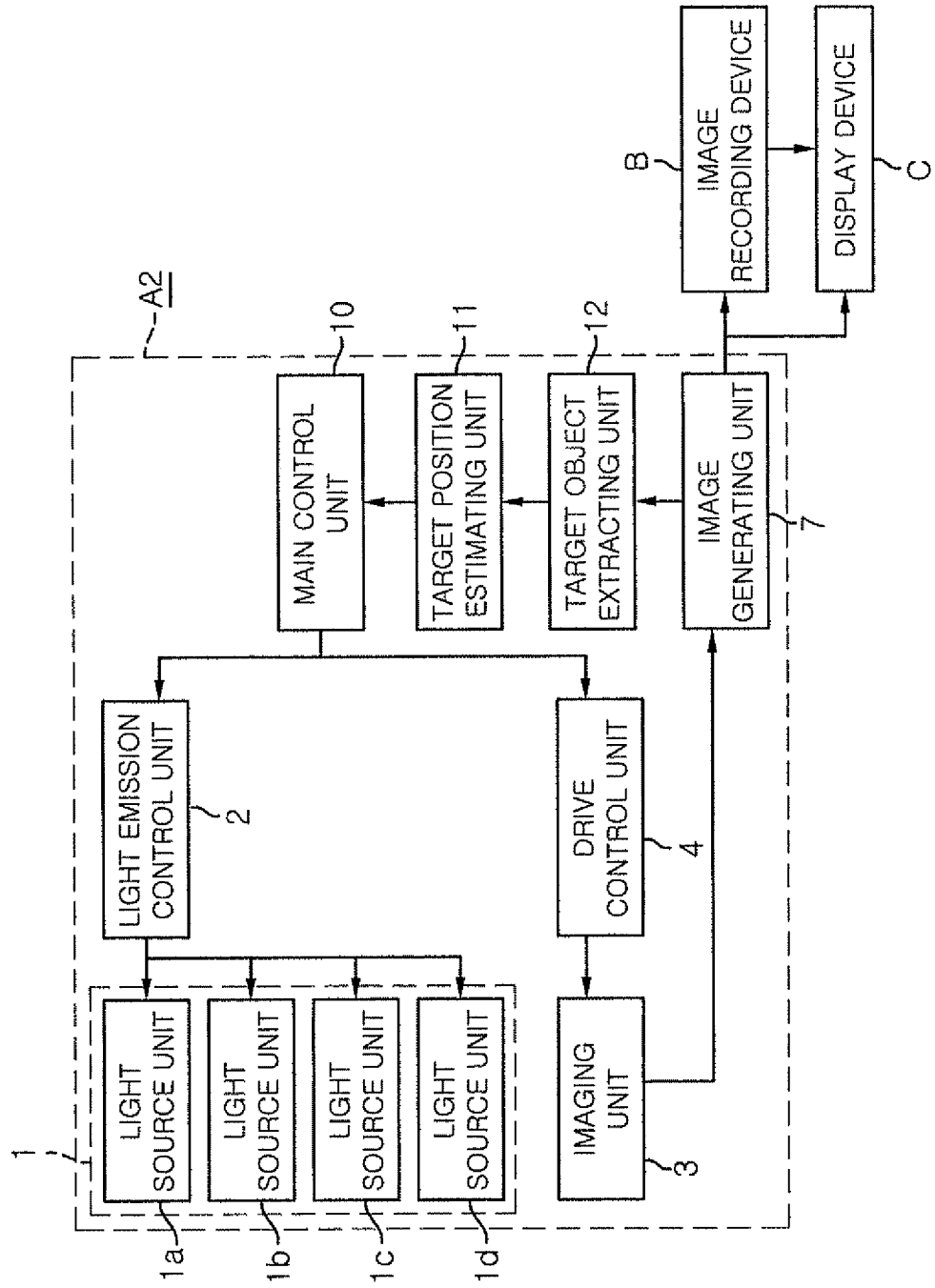

FIG. 16
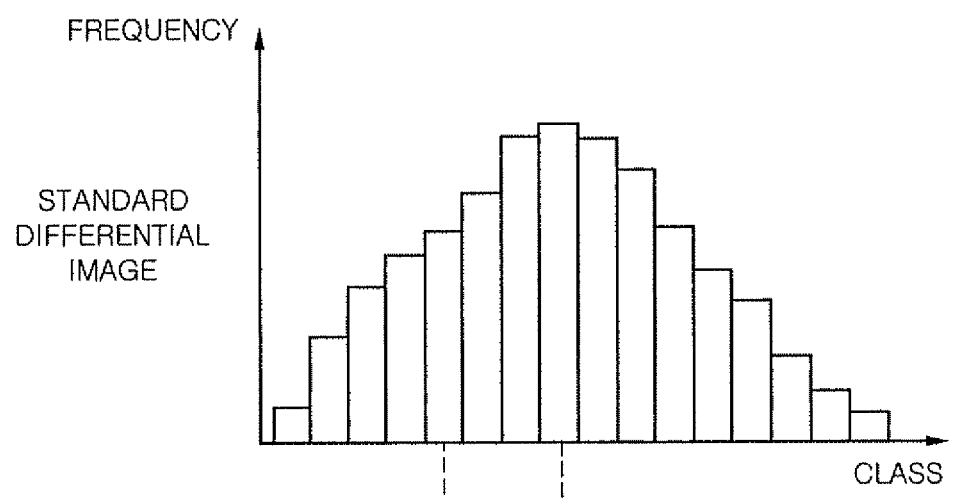
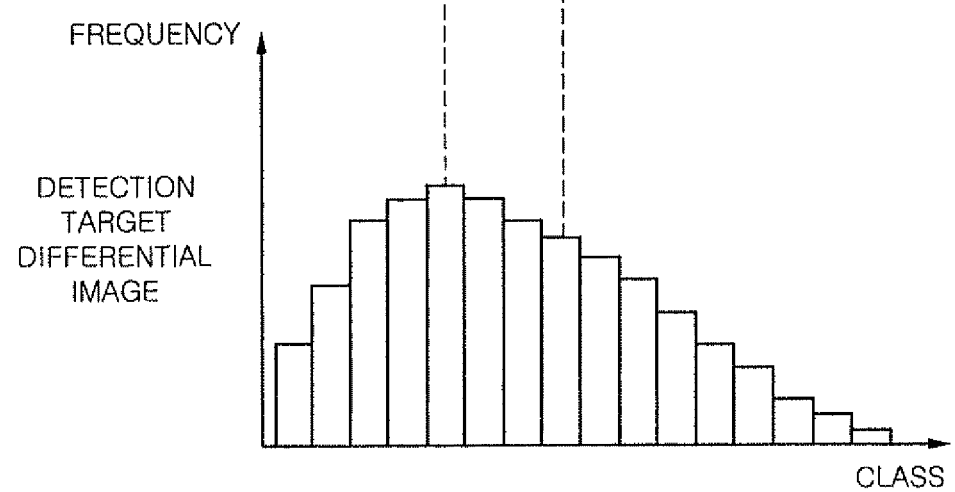

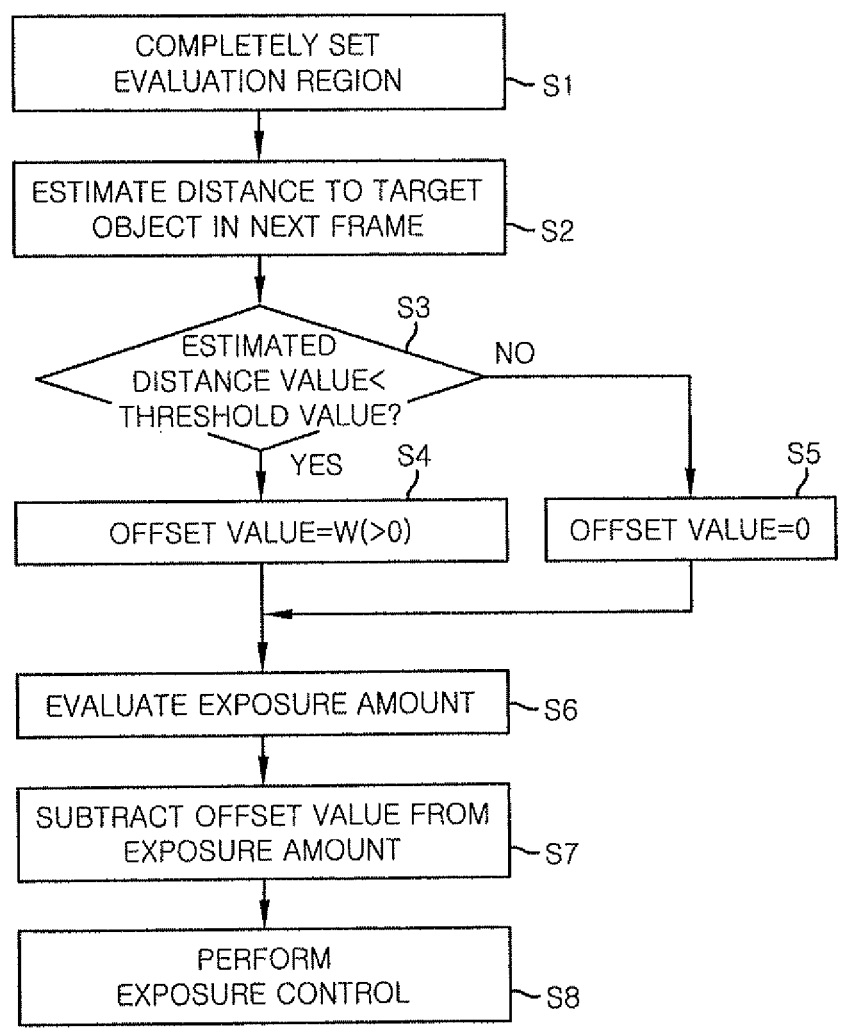

IMAGING APPARATUS FOR TAKING A PICTURE OF A DRIVER OF A MOTOR VEHICLE THROUGH A FRONT GLASS OF THE MOTOR VEHICLE

FIELD OF THE INVENTION

The present invention relates to an imaging apparatus for taking an image with a reduced influence of ambient light.

BACKGROUND OF THE INVENTION

The present applicant has already suggested an imaging apparatus for acquiring a differential image between an image (emission image) taken while irradiating light by a light irradiation means and an image (non-emission image) taken without irradiating light by a light irradiation means (see JP2006-121617A). In such differential image, only the reflected light components of the light irradiated from the light irradiation means are used as pixel values. This helps reduce the influence of ambient light such as sunlight or the like.

In the imaging apparatus described above, if a light-transmitting obstacle such as glass (hereinafter just referred to as "obstacle") exists between a subject and the imaging apparatus, an exposure amount of the subject in the emission image is decreased as the transmittance of the obstacle becomes lower. As a result, quality of the subject image taken through the obstacle may be deteriorated.

In this regard, the deterioration of the quality of the subject image can be restrained by evaluating the exposure amount of the subject image existence range in the taken image (the differential image), namely the amount of light received by an imaging element (which holds true in the following description), and adjusting the evaluated exposure amount to an appropriate value. In such an instance where a driver who drives a motor vehicle is imaged from the front side, a light-reflecting object (vehicle body) exists around a light-transmitting obstacle (vehicle windshield). Therefore, it is not easy to appropriately adjust the exposure amount of the driver (subject image) taken through the vehicle windshield.

In the event that moving target objects (subjects) or target objects differing in size are randomly imaged by the aforementioned imaging apparatus, the light can be reliably irradiated on the target objects by broadening the irradiation range of the light irradiation means and increasing the light emission amount thereof.

If the irradiation range of the light irradiation means is broadened and if the light emission amount thereof is increased, the ratio of the light not irradiated on the object grows larger depending on the situation (position or size) of the target object. Thus, electric power is unnecessarily consumed in the light irradiation means.

In the meantime, the aforementioned conventional imaging apparatus may be used in normally imaging a target object (a human or a motor vehicle) going in and out of a target region. In this case, if a constant amount of light is irradiated regardless of the existence or absence of a target object in the target region, there is posed a problem in that electric power is unnecessarily consumed in the light irradiation means and the lifespan of the light irradiation means becomes shorter.

In the aforementioned conventional imaging apparatus, if a contaminant adheres to an imaging lens or a transparent cover for protection of the imaging lens or if a scratch is generated in the imaging lens or the transparent cover, there is a likelihood that the amount of light received is decreased and the quality of the differential image is reduced. Similarly, it is likely that the amount of light received is decreased and the quality of the differential image is reduced due to the aging deterioration of a light source for irradiating light (e.g., a light emitting diode). In the event that the imaging apparatus is used for monitoring purposes, it is difficult to perceive contamination of the lens or the cover because a monitoring camera is installed in a higher position.

In the aforementioned imaging apparatus, the exposure amount of the subject in the emission image is decreased as the distance to the subject grows larger. The exposure amount is saturated if the distance to the subject is too small. It is therefore necessary to evaluate the exposure amount of the subject image existence range in the taken image (the differential image) and to adjust the evaluated exposure amount to an appropriate value.

However, if the subject is moving within the target region, the position of the subject image is changed on a frame-by-frame basis. The exposure amount cannot be appropriately evaluated if the evaluation range is kept fixed.

SUMMARY OF THE INVENTION

In view of the above, the present invention provides an imaging apparatus capable of restraining deterioration of the quality of an image taken through an obstacle.

The present invention provides an imaging apparatus capable of irradiating light over an appropriate range depending on the situation of a target object and consequently restraining unnecessary consumption of electric power.

The present invention provides an imaging apparatus capable of reducing power consumption when imaging a target object going in and out of a target region and capable of increasing the lifespan of a light source for irradiating light.

The present invention provides an imaging apparatus capable of detecting reduction of a received light amount caused by the generation of a scratch, the adherence of a contaminant or the aging deterioration of a light source.

The present invention provides an imaging apparatus capable of appropriately evaluating the exposure amount even when a subject is moving.

In accordance with a first aspect of the present invention, there is provided an imaging apparatus, including: a light irradiation unit which irradiates light on a target region; an image generating unit which generates a differential image between a first image taken in synchronism with an irradiation time period during which the light irradiation unit irradiates the light and a second image taken in a time period other than the irradiation time period; a transmittance estimation unit which estimates a light transmittance of an object existing in the target region; and an exposure amount adjusting unit which adjusts an exposure amount based on an estimation result of the transmittance estimation unit such that the exposure amount in the differential image falls within a specified proper range, wherein the transmittance estimation unit estimates the transmittance of the object from at least one of the first image, the second image and the differential image.

With this configuration, it is possible to restrain deterioration of the quality of an image taken through an obstacle.

In accordance with a second aspect of the present invention, there is provided an imaging apparatus, including: a light irradiation unit which irradiates light on a target region; an image generating unit which generates a differential image between a first image taken in synchronism with an irradiation time period during which the light irradiation unit irradiates the light and a second image taken in a time period other than the irradiation time period; an information acquiring unit which acquires an information on a situation of a target object to be imaged; and a control unit which controls the light irradiation unit based on the information acquired by the information acquiring unit. Further, the light irradiation unit includes a plurality of light source units each having one or more light sources and a light emission control unit for selecting and energizing some or all of the light source units, and the control unit sets the light source units to be selected by the light emission control unit such that the light irradiated on a region outside the target object gets reduced.

With this configuration, it is possible to restrain unnecessary consumption of electric power by irradiating light over an appropriate range depending on the situation of a target object.

In accordance with a third aspect of the present invention, there is provided an imaging apparatus, including: a light irradiation unit which energizes light sources to irradiate light on a target region; a image generating unit which generates a differential image between a first image taken in synchronism with an irradiation time period during which the light irradiation unit irradiates the light and a second image taken in a time period other than the irradiation time period; a target object existence determining unit which determines whether or not a target object is imaged in the first image, the second image or the differential image; and a control unit which controls the light irradiation unit to energize the light sources in a low power consumption mode when the determination result of the target object existence determining unit is negative and in a normal mode higher in power consumption than in the low power consumption mode when the determination result of the target object existence determining unit is affirmative.

With this configuration, it is possible to reduce power consumption when imaging a target object going in and out of a target region and to increase the lifespan of a light source for irradiating light.

In accordance with a fourth aspect of the present invention, there is provided an imaging apparatus, including: a light irradiation unit provided with one or more light sources and configured to energize the light sources to irradiate light on a target region; a image generating unit which generates a differential image between a first image taken in synchronism with an irradiation time period during which the light irradiation unit irradiates the light and a second image taken in a time period other than the irradiation time period; a detecting unit which detects a decrement of a received light amount in a detection target differential image by comparing the detection target differential image with a standard differential image taken prior to the detection target differential image; and a notification unit which notifies a user that the decrement of the received light amount detected by the detecting unit exceeds a specified upper limit value.

With this configuration, it is possible to detect reduction of a received light amount caused by the generation of a scratch, the adherence of a contaminant or the aging deterioration of a light source.

In accordance with a fifth aspect of the present invention, there is provided an imaging apparatus, including: a light irradiation unit which irradiates light on a target region; a image generating unit which generates a differential image between a first image taken in synchronism with an irradiation time period during which the light irradiation unit irradiates the light and a second image taken in a time period other than the irradiation time period; an evaluation area setting unit which sets a partial area of the differential image at least partially overlapping with a target object moving through the target region as an evaluation area; an exposure amount evaluating unit which evaluates an exposure amount in the evaluation area; an exposure amount adjusting unit which adjusts the exposure amount based on the evaluation result of the exposure amount evaluating unit such that the exposure amount in the evaluation area falls within a specified proper range; and a position estimating unit which estimates a position of the target object at the time of taking a next frame differential image, based on information on at least one of moving direction, travel speed, position and size of the target object, wherein the evaluation area setting unit uses the estimation result of the position estimating unit as position information.

With this configuration, it is possible to appropriately evaluate the exposure amount even when a subject (target object) is moving.

BRIEF DESCRIPTION OF THE DRAWINGS

The objects and features of the present invention will become apparent from the following description of preferred embodiments given in conjunction with the accompanying drawings.

FIG. 1 is a block diagram showing an imaging apparatus according to a first embodiment of the present invention.

FIG. 4 is a flowchart for explaining an evaluation region setting mode in the imaging apparatus of the first embodiment.

FIG. 6 is a block diagram showing an imaging apparatus according to a second embodiment of the present invention.

FIG. 16 is a view for explaining the operation of the imaging apparatus of the fourth embodiment.

FIG. 24 is a flowchart for explaining the operation of an imaging apparatus according to a fourth modified example of the fifth embodiment.

DETAILED DESCRIPTION OF THE PREFERRED EMBODIMENTS

Figure 2A:
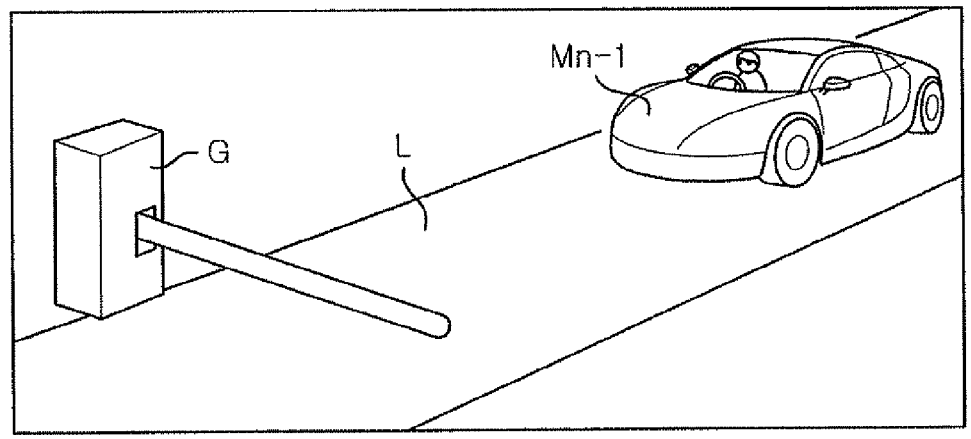
FIGS. 2A to 2C are views for explaining the operation of the imaging apparatus of the first embodiment.

Embodiments of the present invention will now be described in detail with reference to the accompanying drawings which form a part of the subject specification. Identical or similar components throughout the drawings will be designated by like reference symbols with no repeated description made thereon.

Description will be made on the embodiments in which the technical concept of the present invention is applied to an imaging apparatus for imaging a driver of a motor vehicle passing through a tollgate of a toll road such as a highway or a gate of a toll parking lot. However, the imaging apparatus capable of employing the technical concept of the present invention is not limited thereto.

(First Embodiment)

As shown in FIG. 1, the imaging apparatus A of the present embodiment includes a light source unit 1, a light emission control unit 2, an imaging unit 3, a drive control unit 4, a lens unit 5, an incident light amount adjusting unit 6 and an image generating unit 7. The lens unit 5 includes a plurality of infrared emission diodes arranged in a matrix pattern and irradiates infrared light on a target region (vehicle traveling road). The light emission control unit 2 supplies an electric current to the respective infrared emission diodes of the light source unit 1, thereby energizing the infrared emission diodes.

The imaging unit 3 includes an imaging element for sensing the infrared light. The drive control unit 4 drives and controls the imaging unit 3. The lens unit 5 condenses light on the imaging element of the imaging unit 3. The incident light amount adjusting unit 6 adjusts the amount of light incident on the imaging unit 3 by controlling a diaphragm of the lens unit 5.

The image generating unit 7 generates a differential image (light modulation image) between a first image (emission image) taken by the imaging unit 3 in synchronism with the irradiation time period during which the infrared light is irradiated from the light source unit 1 and a second image (non-emission image) taken by the imaging unit 3 during the time period other than the irradiation time period. The differential image generated by the image generating unit 7 is outputted to an external image recording device B and a display device C. The differential image is recorded in the image recording device B and is displayed on the display device C.

The light emission control unit 2 outputs, e.g., a modulation signal of extremely high frequency (e.g., 10 MHz) to the infrared emission diodes, thereby causing the infrared emission diodes to irradiate modulation light on the target region in which an object (motor vehicle) exists. The light emission control unit 2 controls the amount of the modulation light by increasing or decreasing the electric current flowing through the infrared emission diodes.

The incident light amount adjusting unit 6 adjusts the amount of the light incident on the imaging element of the imaging unit 3 through the diaphragm by regulating the opening degree of the diaphragm. In synchronism with the emission time period of the infrared emission diodes pursuant to the modulation signal of the light emission control unit 2, the drive control unit 4 outputs the first and second images to the image generating unit 7 during the irradiation time period during which the modulation light is irradiated and during the non-irradiation time period during which the modulation light is not irradiated. The reflected light components of the light received by the imaging element of the imaging unit 3 are used as pixel values in the first and second images.

In the image generating unit 7, the first and second images outputted from the imaging unit 3 are converted to digital image data. Thereafter, the difference between the image data obtained during the irradiation time period and the image data obtained during the non-irradiation time period is calculated on a pixel-by-pixel basis, thereby generating a differential image (light modulation image) in which only the reflected light components of the modulation light (infrared light) are used as pixel values. The image generating unit 7 is conventionally available and is disclosed in, e.g., JP2006-121617A. No detailed description will be made on the image generating unit 7.

The imaging apparatus A of the present embodiment further includes an automatic exposure unit 8 for adjusting the light emission amount of the light source unit 1 by controlling the light emission control unit 2 and for adjusting the exposure amount by controlling the incident light amount adjusting unit 6 so as to adjust the diaphragm.

In this regard, a windshield of a motor vehicle as an obstacle exists between the imaging apparatus A of the present embodiment and the driver of the motor vehicle as an object to be imaged (subject). The exposure amount of the subject image (driver's image) in the differential image is decreased due to the presence of the windshield of the motor vehicle.

In the prior art example, the exposure amount is evaluated from the pixel values of the whole pixels contained in a partial range (evaluation area) of the differential image. Then, the exposure amount (pixel values) is adjusted to fall within a specified proper range. While the exposure amount of the driver's image taken through the windshield of the motor vehicle is decreased, the exposure amount of the vehicle body image becomes quite high. It is therefore very difficult to adjust the exposure amount of the driver's image to a proper extent by evaluating the exposure amount of the differential image.

In light of this, the imaging apparatus A of the present embodiment includes a transmittance estimation unit 9 for estimating the infrared ray transmittance of the object (the windshield of the motor vehicle) existing in the target region. Depending on the estimated transmittance, the automatic exposure unit 8 adjusts the exposure amount.

The transmittance estimation unit 9 stores in advance multiple kinds of objects (motor vehicles), e.g., the vehicle kinds such as a passenger car or a large-size car like a truck. The transmittance estimation unit 9 specifies the kind of the object (the kind of the motor vehicle) using at least one of the first image, the second image and the differential image. The transmittance estimation unit 9 estimates the transmittance of the specified vehicle kind and notifies the automatic exposure unit 8 of the estimated transmittance.

Next, description will be made on the processing (image processing) of the transmittance estimation unit 9 to specify the vehicle kind. First, the transmittance estimation unit 9 calculates the differences (time-dependent variations) of the pixel values of the whole pixels between the differential images of multiple frames continuously generated by the image generating unit 7. The pixel group having the differences equal to or greater than a predetermined threshold value is extracted as a target object.

Figure 2B:
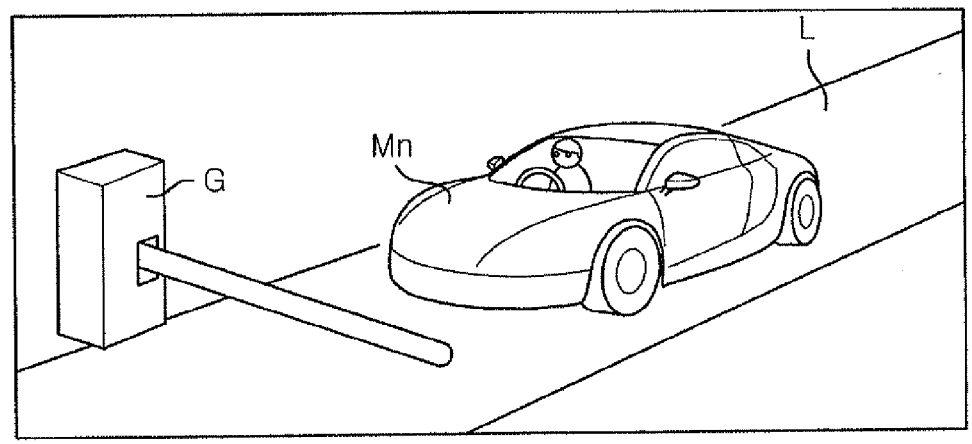

For example, it is assumed that the angle of view of the imaging apparatus A is fixed as shown in FIGS. 2A and 2B and that a lane L, a gate G and a motor vehicle M traveling along the lane L are imaged by the imaging apparatus. The transmittance estimation unit 9 generates a time-dependent difference image by calculating the inter-frame difference between the n−1 frame image (differential image) shown in FIG. 2A and the n frame image (differential image) shown in FIG. 2B.

Figure 2C:
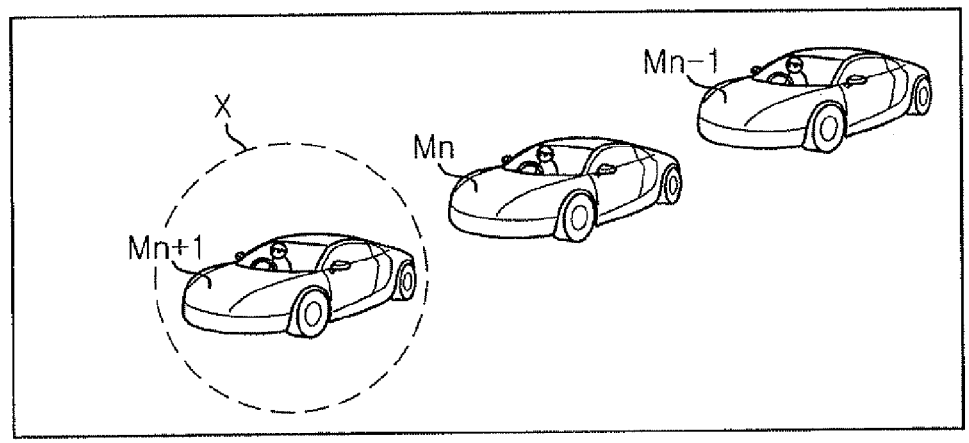

Then, the transmittance estimation unit 9 extracts a target object (a motor vehicle Mn−1 and a motor vehicle Mn) from the time-dependent difference image (see FIG. 2C). In other words, only the images of a moving target object (a motor vehicle Mn−1 and a motor vehicle Mn) are left in the time-dependent difference image because the images of the lane L and the gate G except the moving target object (the motor vehicle M traveling along the lane L) are cancelled by the calculation of the inter-frame difference.

The transmittance estimation unit 9 specifies the vehicle kind by performing a template matching process on the time-dependent difference image using template images for various types of the vehicles stored in advance. It is also possible to specify the vehicle kind based on the number of pixels occupied by the taken object image or the dimension of the motor vehicle, such as height or width, estimated from the taken image. While the transmittance estimation unit 9 of the present embodiment specifies the vehicle kind from the time-dependent difference image of the differential image (light modulation image), it is also possible to specify the vehicle kind from the time-dependent difference image of the first image or the second image.

The infrared ray transmittance is largely changed depending on the relationship between the installation angle of the light source unit 1 and the lens unit 5 and the inclination angle of the windshield of the motor vehicle. The windshield of a large-size car such as a truck or the like is arranged substantially upright. In contrast, the windshield of an ordinary passenger car is inclined by about 30 to 70 degrees with respect to the vertical plane.

For example, if the light source unit 1 and the lens unit 5 are installed horizontally, the transmittance of the windshield of the passenger car is lower than the transmittance of the large-size car. It is often the case that a glass with a function of absorbing and reflecting thermal rays (infrared light) is employed as the windshield in the ordinary passenger car. In this case, the infrared ray transmittance is relatively low in the passenger car.

On the other hand, it is open the case that a glass with no function of absorbing and reflecting thermal rays is employed as the windshield in the large-size car such as a truck or the like. Therefore, the infrared ray transmittance is relatively high in the large-size car. The transmittances of different motor vehicles stored in the transmittance estimation unit 9 need not be necessarily concrete numerical values but may be represented by high or low. For example, in the present embodiment, the transmittance of the ordinary passenger car is set to be "low" and the transmittance of the large-size car is set to "high".

If the transmittance estimated by the transmittance estimation unit 9 is "low", the automatic exposure unit 8 controls the light emission control unit 2 so as to increase the light emission amount of the light source unit 1 and controls the incident light amount adjusting unit 6 so as to increase the incident light amount. On the contrary, if the transmittance estimated by the transmittance estimation unit 9 is "high", the automatic exposure unit 8 controls the light emission control unit 2 so as to reduce the light emission amount of the light source unit 1 and controls the incident light amount adjusting unit 6 so as to reduce the incident light amount.

As set forth above, in the imaging apparatus A of the present embodiment, the transmittance estimation unit 9 estimates the transmittance of the object (the windshield of the motor vehicle) from at least one of the first image, the second image and the differential image. Pursuant to the estimated transmittance, the automatic exposure unit 8 as an exposure amount adjusting means adjusts the exposure amount so that the exposure amount of the differential image can fall within a specified proper range.

Accordingly, it is possible to restrain deterioration of the quality of an image (a driver's image) taken through an obstacle (the windshield of the motor vehicle). In addition, the transmittance estimation unit 9 of the present embodiment determines the kind (vehicle kind) of the object (the motor vehicle) through the image processing and estimates the transmittance based on the kind (vehicle kind) of the object (the motor vehicle). This provides an advantage in that the transmittance estimating process can be simplified.

While the transmittance estimation unit 9 of the present embodiment performs the image processing for the estimation of the transmittance on the time-dependent difference image, it may also be possible to perform the image processing on the difference (background difference image) between the taken image and a background image prepared in advance. The image processing may be performed on the first image, the second image or the differential image (light modulation image).

Instead of determining the vehicle kind from the whole vehicle image, it is possible to determine the vehicle kind by extracting a characterizing part of the motor vehicle (e.g., the frame of the windshield or the pillar) and performing the image processing on the extracted characterizing part. In other words, the frame of the windshield or the pillar (especially, the A-pillar) of the motor vehicle has an inclination angle substantially equal to the inclination angle of the windshield. Accordingly, the vehicle kind can be determined based on the inclination angle of the frame of the windshield or the pillar. Moreover, it is possible to determine the vehicle kind using the size or position of the frame of the windshield or the pillar.

In case where the motor vehicle traveling along the lane is imaged as set forth above, the imaging region of the object (motor vehicle) in the image (the first image, the second image or the differential image) is confined to a partial region. Accordingly, the vehicle kind may be determined by performing the image processing on the partial region of the image.

Figure 3:
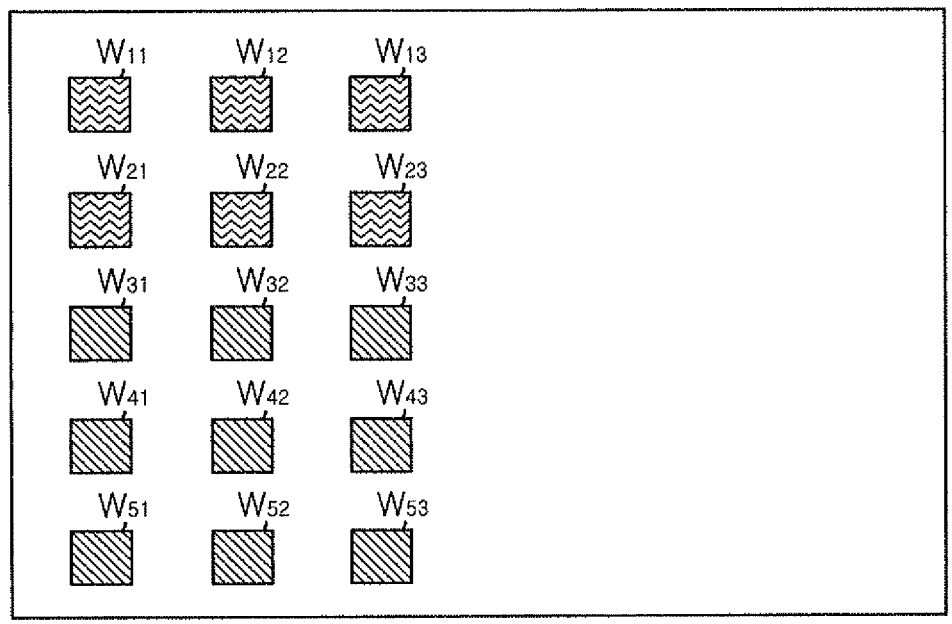
FIG. 3 is a view for explaining evaluation regions in the imaging apparatus of the first embodiment.

For example, if it is assumed that the motor vehicle travels from the left side toward the right side in the target region, the vehicle kind can be specified by setting a plurality of regions Wmn (m=1, 2, 3, 4 or 5 and n=1, 2 or 3) arranged in rows and columns in the substantially left-half area of the differential image as shown in FIG. 3 and evaluating the time-dependent change of the pixel values of the respective regions (evaluation region) Wmn. The large-size car is higher than the ordinary passenger car. If the pixel values of only the three lower evaluation regions Wk1, Wk2 and Wk3 (k=3, 4 or 5) among the five vertically-arranged evaluation regions Wm1, Wm2 and Wm3 are changed over time, it is possible to specify the motor vehicle as a ordinary passenger car. If all the pixel values of the five vertically-arranged evaluation regions Wm1, Wm2 and Wm3 are changed over time, is possible to specify the motor vehicle as a large-size car.

The arrangement of the evaluation regions Wmn in the taken image is important in order to accurately specify the vehicle kind. For example, if the target region includes an illumination device in the background, the pixel value of the region (pixel group) gets saturated. It is therefore preferable that the region with the background illumination device is not included in the evaluation regions. The pixel value of the region (pixel group) which the headlight of the motor vehicle is imaged shows extremely high variation. It is therefore preferable that the region with the headlight of the motor vehicle is not included in the evaluation regions. In light of this, the imaging apparatus A of the present embodiment has an evaluation region setting mode in which the transmittance estimation unit 9 automatically sets the evaluation regions W. The evaluation regions W can be automatically set by performing the evaluation region setting mode after installation of the imaging apparatus A.

Next, the evaluation region setting mode performed by the transmittance estimation unit 9 will be described with reference to the flowchart shown in FIG. 4.

If the evaluation region setting mode is performed, the transmittance estimation unit 9 initialize arrangement of the evaluation regions W (e.g., in the left upper corner of the taken image) and resets a shift counter to zero (S1). Then, the transmittance estimation unit 9 determines whether the pixel values of the evaluation regions W in the actually-taken image (e.g., the differential image) is not saturated and whether the variation of the pixel values is less than an upper limit value (S2).

If the pixel values of the evaluation regions W are not saturated and if the variation of the pixel values is less than the upper limit value (if "yes" in step S2), the transmittance estimation unit 9 fixes the evaluation regions W (S3). If the number of the fixed evaluation regions W does not exceed the necessary number (if "no" in step S4), the evaluation regions W are changed (S5). Then, the flow returns back to step S1.

On the other hand, if the pixel values of the evaluation regions W are saturated or if the variation of the pixel values is equal to or larger than the upper limit value (if "no" in step S2), the transmittance estimation unit 9 compares a value of the shift counter with a specified threshold value (S6). In case where the shift counter value is less than the threshold value (if "yes" in step S6), the transmittance estimation unit 9 shifts the evaluation regions W and increases the shift counter (step S7).

Then, the flow returns back to step S2. If the shift counter value is equal to or larger than the threshold value (if "no" in step S6), the transmittance estimation unit 9 clears the evaluation regions W and terminates the evaluation region setting mode (S8).

If the number of the fixed evaluation regions W exceeds the necessary number (if "yes" in step S4), the transmittance estimation unit 9 finishes arranging the evaluation regions W (S9) and terminates the evaluation region setting mode.

As described above, with the imaging apparatus A of the present embodiment, the transmittance estimation unit 9 automatically set the evaluation regions W after performing the evaluation region setting mode in a state that the object (motor vehicle) does not exist in the target region. This makes it possible for an installer to greatly save the time required in setting the evaluation regions.

Figure 5A:
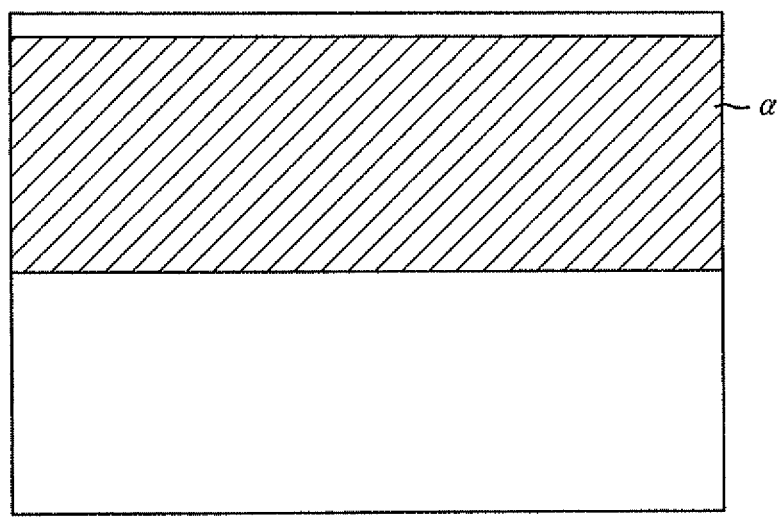
FIGS. 5A and 5B are views for explaining an infrared ray irradiation range in the imaging apparatus of the first embodiment.

When the automatic exposure unit 8 adjusts the exposure amount based on the estimation result of the transmittance estimation unit 9, the light emission control unit 2 may energize some of the infrared emission diodes of the light source unit 1 so that the infrared light can be irradiated on only the region where the driver of the motor vehicle as a subject is to be imaged. For example, since the ordinary passenger car and the large-size car differ in height from each other, the infrared light may be irradiated only on the irradiation range α (hatched in FIG. 5A) corresponding to the upper half portion of the image with respect to the large-size car relatively tall in vehicle height.

Figure 5B:
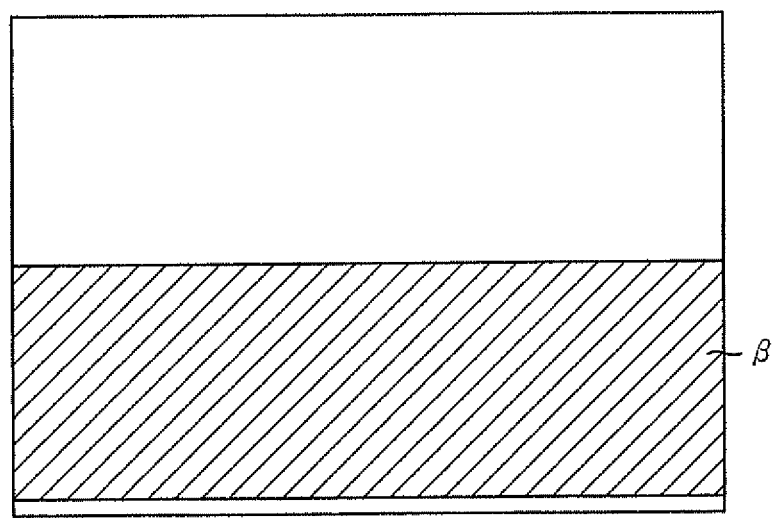

The infrared light may be irradiated only on the irradiation range β (hatched in FIG. 5B) corresponding to the lower half portion of the image with respect to the ordinary passenger car relatively high in vehicle height. If the irradiation range of the infrared light of the light source unit 1 is changed depending on the vehicle kind as such, there is provided an advantage in that energy can be saved as compared with a case where the infrared light is irradiated on the whole range at all times.

When the transmittance estimation unit 9 performs estimation of the transmittance (specifying the vehicle kind), the infrared light may be irradiated only on the irradiation region required to specify the vehicle kind, e.g., the region including the windshield of the motor vehicle. In this case, there is provided an advantage in that power can be saved by reducing the irradiation range of the infrared light of the light source unit 1.

(Modified Example of the First Embodiment)

In the first embodiment described above, the transmittance of the windshield of the motor vehicle as an obstacle is estimated by specifying the vehicle kind. In the present modified example, however, the transmittance is estimated based on the pixel values of the image of the windshield. The configuration of the imaging apparatus A of the present modified example remains the same as the configuration of the imaging apparatus of the first embodiment. The same components will be designated by like reference symbols with no illustration and description made thereon.

In the present modified example, the transmittance estimation unit 9 extracts the pixel region in which the windshield (or the frame of the windshield) is imaged, using the template matching method described in respect of the first embodiment. Then, the transmittance estimation unit 9 compares the pixel values of the pixels contained in the extracted pixel region with a threshold value. The transmittance estimation unit 9 estimates the transmittance to be relatively low if the pixel values are less than the threshold value. On the contrary, the transmittance estimation unit 9 estimates the transmittance to be relatively high if the pixel values are equal to or larger than the threshold value. Alternatively, the average value of the pixel values of the respective pixels contained in the extracted pixel region may be compared with the threshold value.

In the imaging apparatus A as described above, the transmittance estimation unit 9 extracts the characterizing part (the windshield or the frame thereof) of the object (the motor vehicle) from the image and estimates the transmittance of the motor vehicle (the windshield) based on the pixel values of the characterizing part. This makes it possible to enhance the transmittance estimation accuracy and to further restrain deterioration of the image quality.

In the first embodiment and the modified example thereof described above, the transmittance estimation unit 9 specifies the vehicle kind from the differential image (light modulation image). However, the vehicle kind may be specified using the first image or the second image. In case where the vehicle kind is specified using the differential image, there is provided an advantage in that a stable specifying result can be obtained by excluding the influence of the ambient light. In case where the vehicle kind is specified using the first image or the second image, there is provided an advantage in that, at the daytime, it is possible to specify the vehicle kind even in the region where the irradiation amount of the infrared light is small and further that, as compared with the case where the vehicle kind is specified using the differential image, it is possible to specify the kind of the motor vehicle existing at a distant place.

(Second Embodiment)

Next, an imaging apparatus according to a second embodiment will be described with reference to FIGS. 6 through 10. Components identical with or corresponding to those of the imaging apparatus of the first embodiment will be designated by like reference symbols with no repeated description made thereon.

As shown in FIG. 6, the imaging apparatus A1 of the second embodiment includes a plurality of (four, in the illustrated example) light source units 1a through 1d for irradiating light (infrared light) on a target region (a vehicle traveling lane), a light emission control unit 2 for separately energizing the light source units 1a to 1d, an imaging unit 3 having an imaging element sensitive to the infrared light, and a drive control unit 4 for driving and controlling the imaging unit 3.

Further, the imaging apparatus A1 includes an image generating unit 7 for generating a differential image (light modulation image) between a first image (emission image) taken by the imaging unit 3 in synchronism with the irradiation time period during which the infrared light is irradiated from the light source units 1a to 1d and a second image (non-emission image) taken by the imaging unit 3 during the time period other than the irradiation time period. The differential image generated by the image generating unit 7 is outputted to an external image recording device B and a display device C. The differential image is recorded in the image recording device B and is displayed on the display device C.

Figure 7:
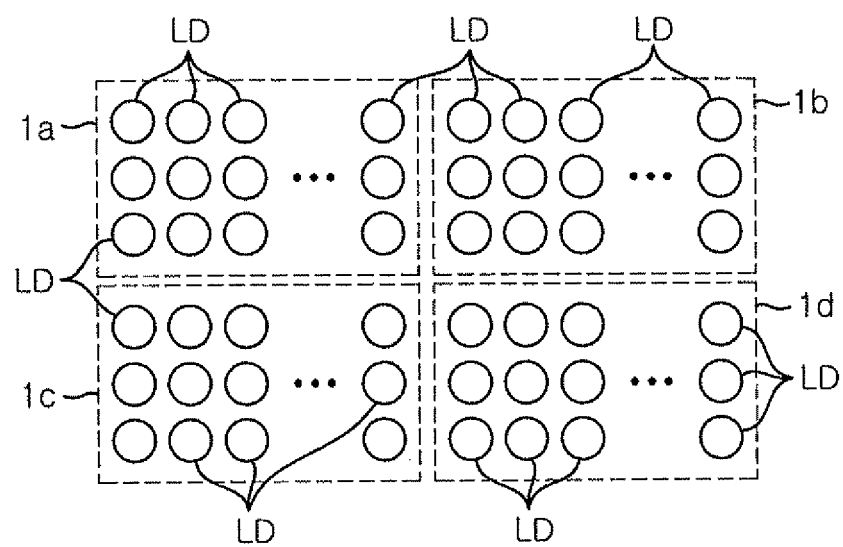
FIG. 7 is a schematic configuration view showing a light source unit of the imaging apparatus of the second embodiment.

As shown in FIG. 7, the light source units 1a to 1d are arranged in two rows and two columns. Each of the light source unit 1a to 1d includes a plurality of infrared emission diodes LD arranged in a matrix pattern. The light emission control unit 2 outputs, e.g., a modulation signal of extremely high frequency (e.g., 10 MHz) to the infrared emission diodes LD, thereby causing the infrared emission diodes LD to irradiate modulation light on the target region in which a target object (motor vehicle) exists.

In synchronism with the emission time period of the infrared emission diodes LD pursuant to the modulation signal of the light emission control unit 2, the drive control unit 4 outputs the first and second images to the image generating unit 7 during the irradiation time period during which the modulation light is irradiated and during the non-irradiation time period during which the modulation light is not irradiated. The reflected light components of the light received by the imaging element of the imaging unit 3 are used as pixel values in the first and second images.

The imaging apparatus A1 of the present embodiment includes an information acquiring means for acquiring the information on the situation of the target object (motor vehicle) and a control means for controlling the light irradiating means (the light source units 1a to 1d and the light emission control unit 2) based on the information acquired by the information acquiring means. In the present embodiment, the information acquiring means includes a target object extracting unit 12 for extracting the target object (motor vehicle) from the differential image generated by the image generating unit 7 and a target position estimating unit 11 for estimating the situation of the target object (e.g., the position and size of the target object) extracted by the target object extracting unit 12.

The target object extracting unit 12 calculates the differences (time-dependent variations) of the pixel values of the whole pixels between the differential images of multiple frames continuously generated by the image generating unit 7. A group of pixels having the differences equal to or greater than a predetermined threshold value is extracted as a target object.

For example, it is assumed that the motor vehicle M, i.e., a target object, moves (travels) toward the gate G along the lane L (from the right upper side toward the left lower side in FIG. 2). If the travel speed of the motor vehicle M is known, it is possible to estimate the position of a motor vehicle Mn+1 imaged in the next n+1 frame.

Accordingly, the target position estimating unit 11 calculates a moving speed (travel speed) based on the inter-frame displacement amount of the positions of the target objects (the motor vehicle Mn−1 and the motor vehicle Mn) extracted by the target object extracting unit 12. Based on the moving speed and the target object position in the previous frame, the target position estimating unit 11 estimates the position of the target object (the motor vehicle Mn+1) in the next frame (the n+1 frame) (see the broken line in FIG. 2C). The target position estimating unit 11 transmits the estimation result (the information on the position of the driver's seat of the motor vehicle as the target object) to a main control unit 10 as the control means.

In this regard, the size of the target object is related to the height of the driver's seat (the windshield) which varies depending on the kind of the motor vehicle. For example, the large-size car such as a bus or a truck and the small-size car such as an ordinary passenger car differ largely in height and driver's seat position from each other even if they are in the same position.

Accordingly, if the kind of the motor vehicle passing along the lane L is limited to one of the small-size car and the large-size car, the position of the driver's seat of the motor vehicle as the target object can be estimated using only the position of the motor vehicle extracted in the aforementioned manner. However, if the small-size car or the large-size car can pass the same lane L, the position of the driver's seat of the motor vehicle as the target object need to be estimated based on not only the position of the extracted motor vehicle but also the size of the motor vehicle.

Based on the estimation result of the target position estimating unit 11, the main control unit 10 sets the light source units 1a to 1d to be selected (energized) by the light emission control unit 2 so that an appropriate amount of modulation light can be irradiated on the region including the target object (the driver's seat of the motor vehicle Mn+1) while reducing the modulation light irradiated on the region outside the target object.

For example, if the estimated position of the target object in the next frame lies in the left lower region with respect to the image center, it is presumed that the motor vehicle Mn+1 is positioned in a relatively close position. In this case, only the light source unit 1c is selected (energized) by the light emission control unit 2. On the contrary, if the estimated position of the target object lies in the right upper region with respect to the image center, it is presumed that the motor vehicle Mn+1 is positioned in a relatively distant position. In this case, only the light source units 1a, 1b and 1d are selected (energized) by the light emission control unit 2.

The size of the driver's seat as the target object is changed depending on the kind of the motor vehicle. Based on the size of the target object (the vehicle kind, i.e., the large-size car or the small-size car) and the position thereof, the number of the light source units 1a to 1d selected is made larger in case of the large-size car than in case of the small-size car when the large-size car and the small-size car are substantially in the same position.

With the imaging apparatus A1 of the present embodiment, the main control unit 10 sets the light source units 1a to 1d to be selected by the light emission control unit 2, based on the information on the situation of the target object (the motor vehicle). Accordingly, the light irradiated on the region outside the target object can be reduced. Thus, it is possible to restrain unnecessary power consumption by irradiating the light on an appropriate range depending on the situation of the target object.

Alternatively, the target object extracting unit 12 and the target position estimating unit 11 may sequentially estimate the information on the situation (the size and the position) of the target object from the differential images of multiple consecutive frames. Based on the information thus estimated, the main control unit 10 may set the light source units 1a to 1d to be selected (energized) by the light emission control unit 2 on a frame-by-frame basis.

(First Modified Example of the Second Embodiment)

Figure 8:
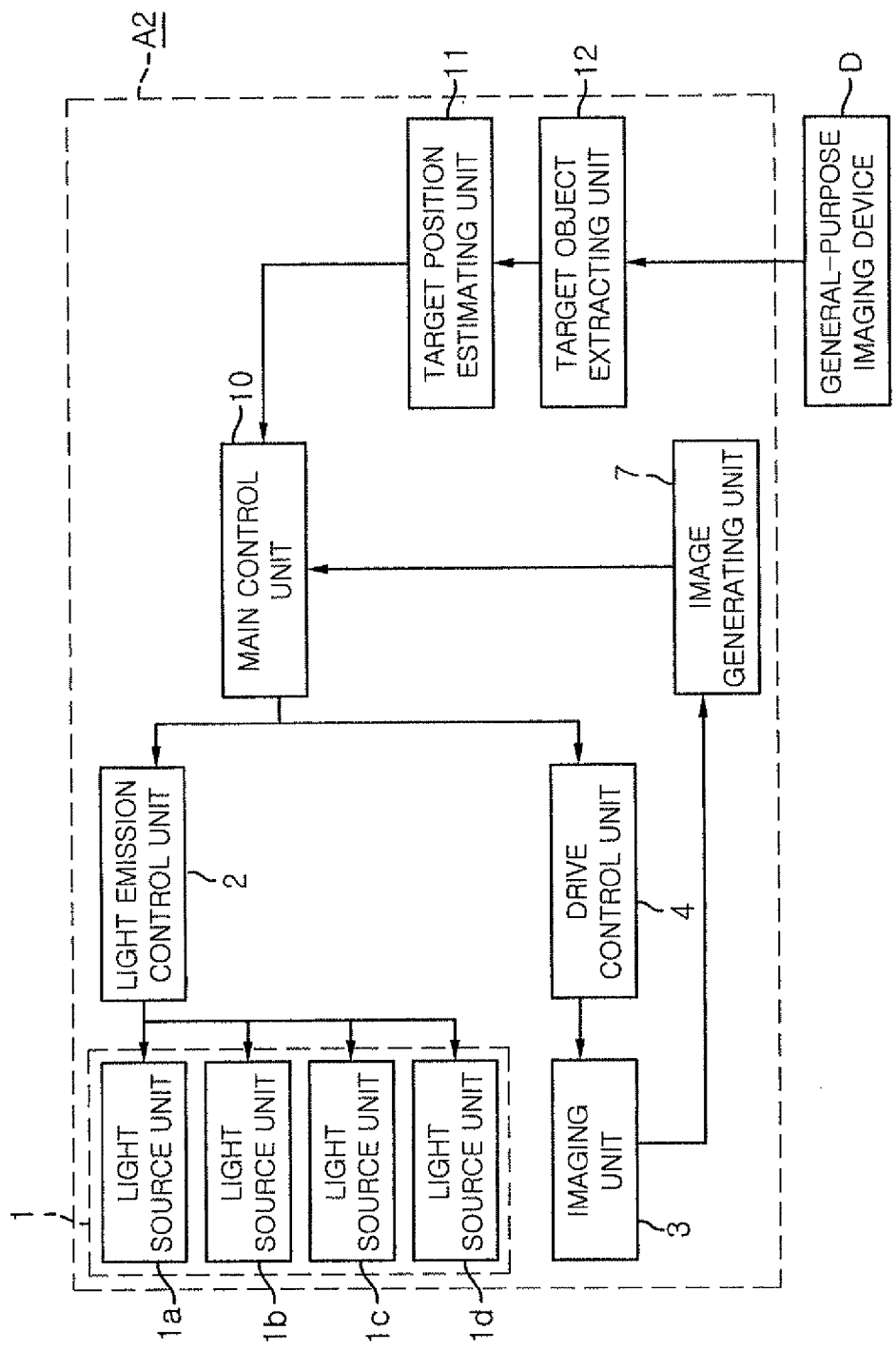
FIG. 8 is a block diagram showing an imaging apparatus according to a first modified example of the second embodiment of the present invention.

As shown in FIG. 8, the imaging apparatus A2 is characterized in that the target object extracting unit 12 extracts the target object (the motor vehicle) not from the differential image generated by the image generating unit 7 but from the image taken by an external general-purpose imaging device D. The basic configuration of the imaging apparatus A2 of the present modified example remains the same as the configuration of the imaging apparatus A1 of the second embodiment. Identical components will be designated by like reference symbols with illustration and description thereon omitted appropriately.

The general-purpose imaging device D is, e.g., a commercially-available general-purpose CCD camera, and is configured to image a target region substantially at the same view angle as the view angle of the imaging apparatus A2. The image taken by the general-purpose imaging device D is outputted to the target object extracting unit 12.

Just like the second embodiment, the target object extracting unit 12 calculates the differences (time-dependent variations) of the pixel values of the whole pixels between the images of multiple frames continuously taken by the general-purpose imaging device D. The pixel group having the differences equal to or greater than a predetermined threshold value is extracted as a target object. The processing performed by the target position estimating unit 11 and the main control unit 10 remains the same as that of the second embodiment. Therefore, no description will be made thereon.

In the imaging apparatus A2 of the present modified example, just like the imaging apparatus A1 of the second embodiment, the main control unit 10 as the control means sets the light source units 1a to 1d to be selected by the light emission control unit 2, based on the information on the situation of the target object of the next frame (the size and position of the target object) acquired by the information acquiring means (the target object extracting unit 12 and the target position estimating unit 11). Accordingly, the light irradiated on the region outside the target object can be reduced when imaging the differential image of the next frame.

Thus, it is possible to restrain unnecessary power consumption by irradiating the light on an appropriate range depending on the situation of the target object. Alternatively, the target object extracting unit 12 and the target position estimating unit 11 may sequentially estimate the information on the situation (the size and position) of the target object from the images of multiple frames taken by the general-purpose imaging device D. Based on the information thus estimated, the main control unit 10 may set the light source units 1a to 1d to be selected (energized) by the light emission control unit 2 on a frame-by-frame basis.

(Second Modified Example of the Second Embodiment)

Figure 9:
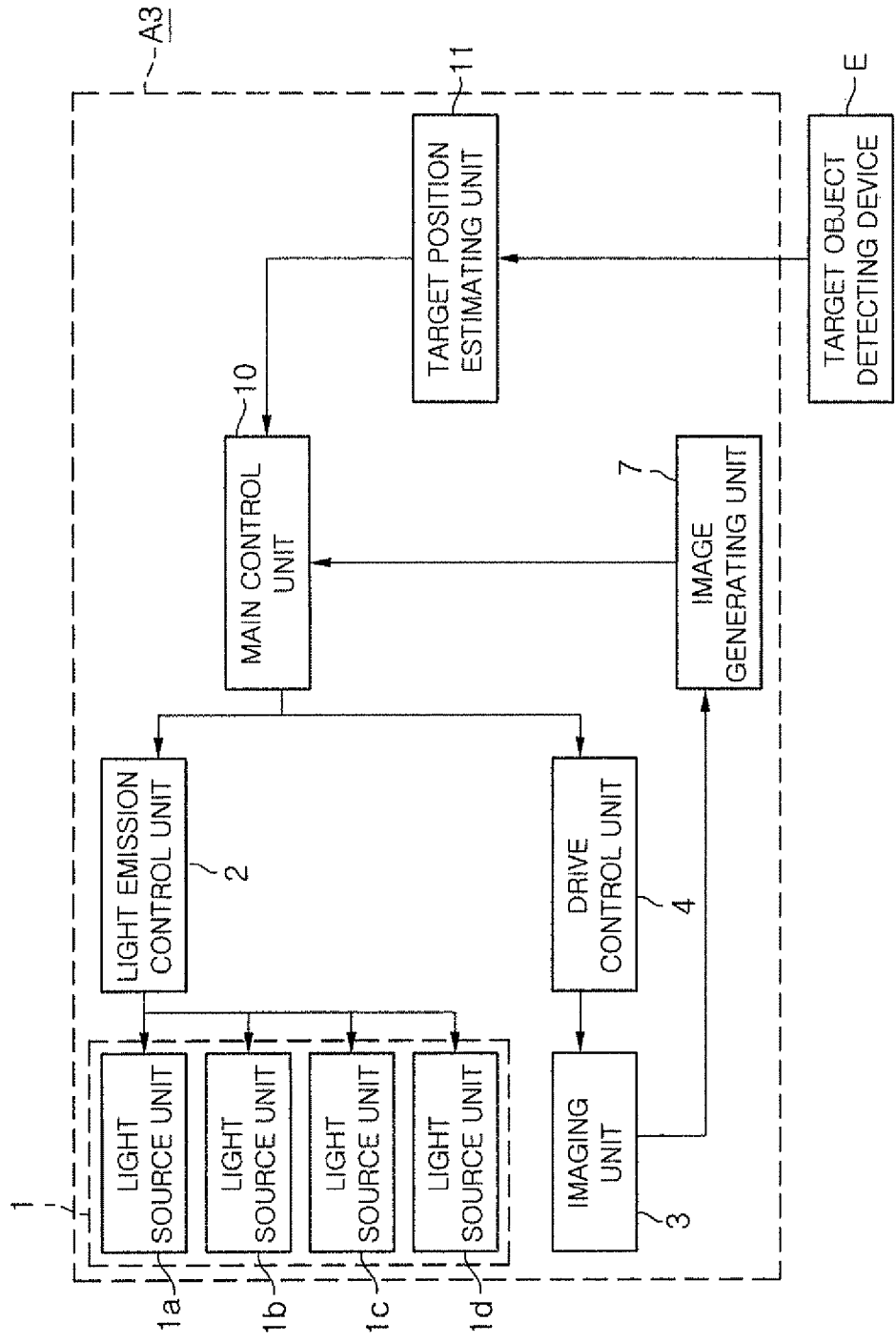
FIG. 9 is a block diagram showing an imaging apparatus according to a second modified example of the second embodiment of the present invention.

As shown in FIG. 9, the imaging apparatus A3 is characterized in that a target position estimating unit 11 acquires (estimates) the information on the situation of the target object based on the target object detected by a target object detecting device E instead of the target object extracting unit 12. The basic configuration of the imaging apparatus A3 of the present modified example remains the same as the configuration of the imaging apparatus A1 of the second embodiment. Identical components will be designated by like reference symbols with illustration and description thereon omitted appropriately.

The target object detecting device E transmits, e.g., electric waves or ultrasonic waves along a lane L and receives the reflected waves coming back from a motor vehicle as a target object, thereby detecting the distance to the motor vehicle and the travel speed of the motor vehicle. The target object detecting device E detects the height of the motor vehicle through the use of an infrared sensor. The target object detecting device E outputs the detection results (the information on the position and the size (height) of the motor vehicle) to the target position estimating unit 11 of the imaging apparatus A3.

Based on the information on the position of the target object (the motor vehicle) and the information on the size (height) thereof acquired from the target object detecting device E, the target position estimating unit 11 estimates the position of the target object (the driver's seat of the motor vehicle) when taking the differential image of the next frame and outputs the estimation result to the main control unit 10. The processing performed by the main control unit 10 remains the same as that of the second embodiment. Therefore, no description will be made thereon.

In the imaging apparatus A3 of the present modified example, just like the imaging apparatus A1 of the second embodiment and the imaging apparatus A2 of the first modified example thereof, the main control unit 10 as the control means sets the light source units 1a to 1d to be selected by the light emission control unit 2, based on the information on the situation of the target object of the next frame (the size and position of the target object) acquired by the information acquiring means (the target position estimating unit 11). Accordingly, the light irradiated on the region outside the target object can be reduced when imaging the differential image of the next frame.

Thus, it is possible to restrain unnecessary power consumption by irradiating the light on an appropriate range depending on the situation of the target object. Alternatively, the target position estimating unit 11 may sequentially estimate the information on the situation of the target object based on the position and size of the target object detected by the target object detecting device E. Based on the information thus estimated, the main control unit 10 may set the light source units 1a to 1d to be selected (energized) by the light emission control unit 2 on a frame-by-frame basis.

(Third Modified Example of the Second Embodiment)

Figure 10:
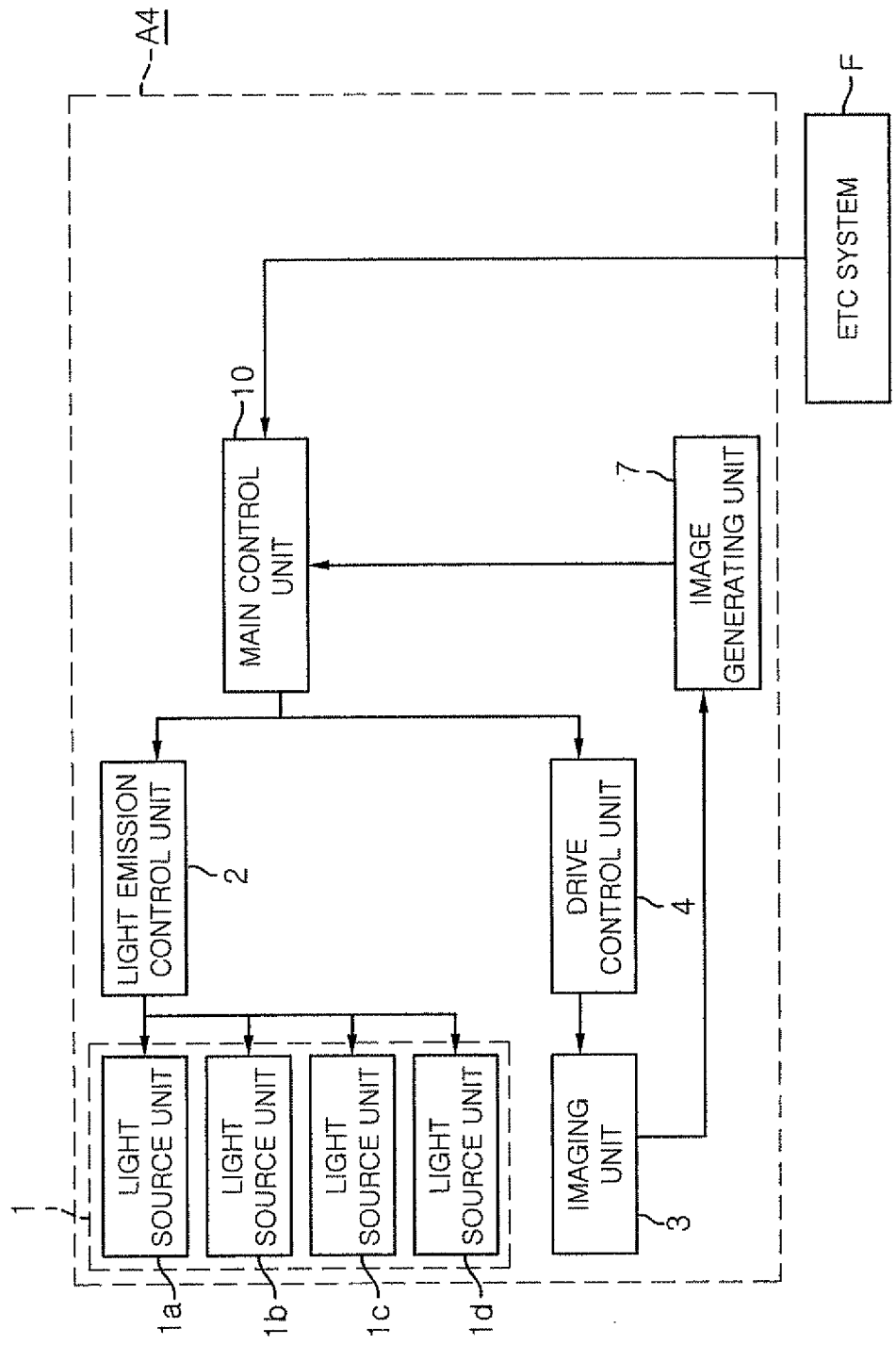
FIG. 10 is a block diagram showing an imaging apparatus according to a third modified example of the second embodiment of the present invention.

As shown in FIG. 10, the imaging apparatus A4 of the present modified example is characterized in that the main control unit 10 sets the light source units 1a to 1d to be selected by the light emission control unit 2, based on the information on the situation of the target object (the motor vehicle) received from an external system (e.g., an ETC system F). Accordingly, the light irradiated on the region outside the target object can be reduced. The basic configuration of the imaging apparatus A4 of the present modified example remains the same as the configuration of the imaging apparatus A1 of the second embodiment. Identical components will be designated by like reference symbols with illustration and description thereon omitted appropriately.

The ETC (Electronic Toll Collection, a registered trademark) system F acquires, through wireless communications, the information set up in a vehicle-mounted device mounted to the motor vehicle, more particularly the vehicle information written on a vehicle inspection certificate, e.g., the vehicle body type (such as a box type, a station wagon type or a truck type) and the vehicle dimension (such as a total length, a total width or a total height). In the imaging apparatus A4 of the present modified example, the main control unit 10 acquires the vehicle information obtained by the ETC system F from the motor vehicle as the target object. Based on the vehicle information thus acquired, the main control unit 10 sets the light source units 1a through 1d to be selected by the light emission control unit 2.

In the imaging apparatus A4 of the present modified example, the vehicle size (the vehicle kind) is used as the information on the situation of the target object. The light source units 1a-1d to be selected (energized) by the light emission control unit 2 are set so that the modulation light can be irradiated on the driver's seat even if the position of the driver's seat is changed depending on the vehicle kind and so that the modulation light irradiated on the region outside the driver's seat can be reduced. Accordingly, it is possible to restrain unnecessary power consumption by irradiating the light on an appropriate range depending on the vehicle kind.

In the second embodiment and the modified examples thereof, the light source units 1a to 1d are selectively energized so as to reduce the light irradiated on the region outside the target object. Alternatively, the modulation light may be irradiated on only the target object by mechanically changing the posture of a single light source unit 1.

(Third Embodiment)

Next, an imaging apparatus according to a third embodiment will be described with reference to FIGS. 11 through 14. Components identical with or similar to those of the preceding embodiments will be designated by like reference symbols with no repeated description made thereon.

Figure 11:
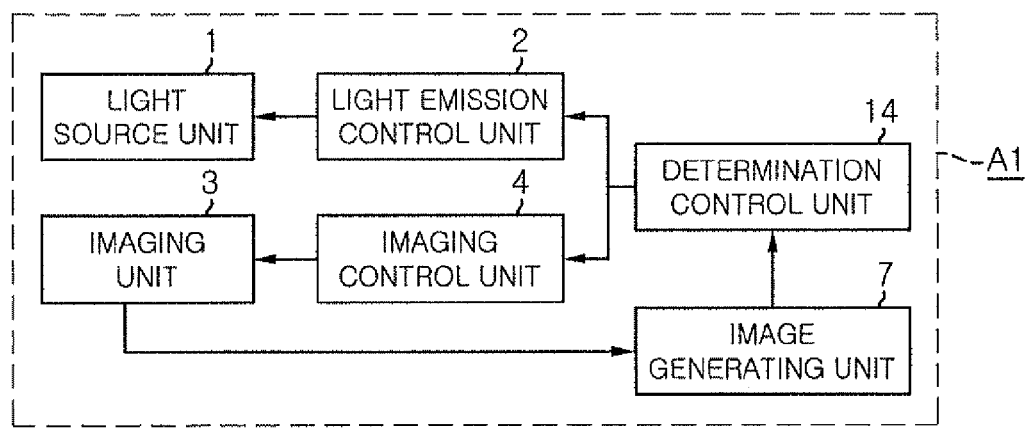
FIG. 11 is a block diagram showing an imaging apparatus according to a third embodiment of the present invention.

As shown in FIG. 11, the imaging apparatus A6 (monitoring camera) of the present embodiment includes a light source unit 1 for energizing light sources to irradiate light on a target region, a light emission control unit 2 for supplying electric power to the light source unit 1 to energize the light sources, and an imaging unit 3 having a two-dimensional CCD image sensor (not shown) and a lens (not shown) for condensing the light on the light receiving surface of the image sensor.

Further, the imaging apparatus A6 includes an imaging control unit 4 for controlling the exposure time and exposure amount of the image sensor, an image generating unit 7 for generating a differential image between a first image taken by the imaging unit 3 in synchronism with the irradiation time period during which the light is irradiated from the light source unit 1 and a second image taken by the imaging unit 3 during the time period other than the irradiation time period, and a determination control unit 14 for controlling the light emission control unit 2 and the imaging control unit 4. The light source unit 1 may be provided independently of the imaging apparatus.

The light source unit 1 includes a plurality of infrared emission diodes (not shown) as light sources arranged in rows and columns. The light emission control unit 2 adjusts the light emission amount of the light sources (infrared emission diodes) by increasing or decreasing the amount of the electric power supplied to the light source unit 1. The light source unit 1 and the light emission control unit 2 make up a light irradiation means. The imaging control unit 4 controls the exposure time of the image sensor using a so-called electronic shutter technology or controls the exposure amount of the image sensor by adjusting the opening degree of a diaphragm (not shown) interposed between the lens and the image sensor.

The determination control unit 14 includes a microcomputer as a main component. The determination control unit 14 controls the light emission control unit 2 so that the light source unit 1 emits light. Specifically, the irradiation time period during which the light is irradiated and the non-irradiation time period during which the light is not irradiated is repeated at a short cycle during a imaging time period sufficiently shorter than the frame rate of the imaging unit 3.

The determination control unit 14 further controls the image generating unit 7 so that a differential image can be produced. The image generating unit 7 generates the differential image between an image (first image) taken by the imaging unit 3 through the control of the imaging control unit 4 in synchronism with the irradiation time period and an image (second image) taken by the imaging unit 3 through the control of the imaging control unit 4 in synchronism with the non-irradiation time period.

In the differential image generated by the image generating unit 7, the pixel information (pixel values) attributable to the ambient light (especially, the sunlight) is cancelled by the subtraction processing. It is therefore possible to obtain an image (subject image) with the reduced influence of the ambient light.

The determination control unit 14 further adjusts the light emission amount of the light source unit 1 by controlling the light emission control unit 2 so that the average value of the pixel values of the whole pixels or the average value of the pixel values of the central area pixels in the second image can fall within a specified proper range. The determination control unit 14 adjusts the exposure time and the exposure amount of the image sensor by controlling the imaging control unit 4. Such adjustment is usually referred to as auto exposure.

Figure 12A:
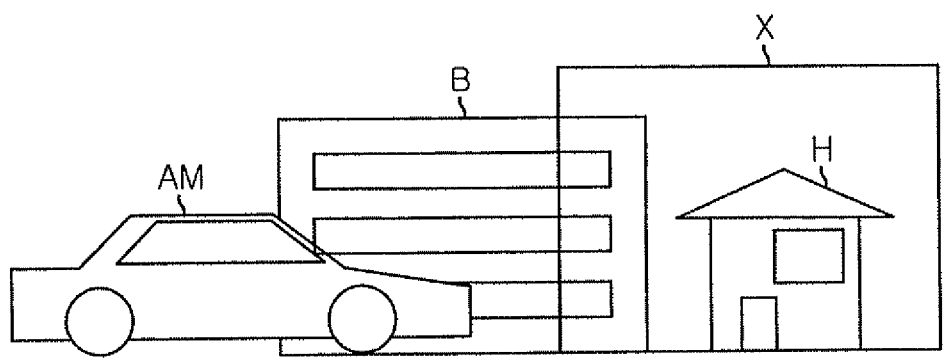
FIGS. 12A and 12B are views for explaining the operation of the imaging apparatus of the third embodiment.
Figure 12B:
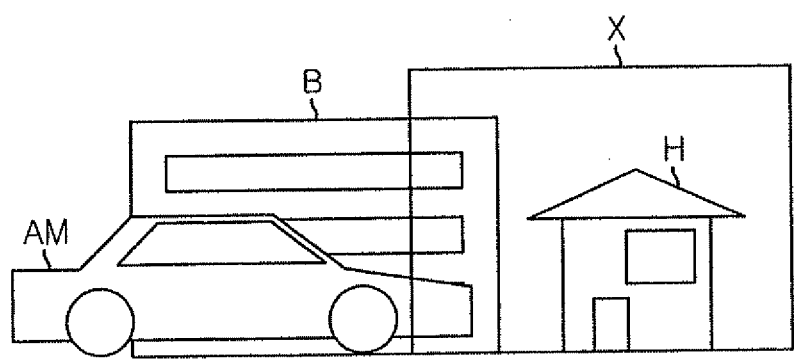

Herein, it is assumed that a motor vehicle AM passing through a monitoring region (target region) X as shown in FIGS. 12A and 12B is imaged as a target object (subject) by the imaging apparatus A6 of the present embodiment. In the target region X, a house H and a building B exist as a background. The motor vehicle AM as the target object is assumed to pass through a region just in front of the background.

As described in respect of the prior art, if a constant amount of light is irradiated regardless of the existence or absence of the target object (the motor vehicle AM) in the target region X when the imaging apparatus normally images the target object (the motor vehicle AM) going in and out of the target region X, there is posed a problem in that electric power is unnecessarily consumed in the light source unit 1 and the lifespan of the light sources (infrared emission diodes) of the light source unit 1 becomes shorter.

In the imaging apparatus A6 of the present embodiment, the determination control unit 14 determines whether the target object (the motor vehicle AM) exists in the target region X. If the target object (the motor vehicle AM) does not exist in the target region X as shown in FIG. 12A, namely if the determination result is negative, the determination control unit 14 controls the light emission control unit 2 in such a manner as to cause the light source unit 1 to emit a relatively small amount of light.

If the target object (the motor vehicle AM) exists in the target region X as shown in FIG. 12B, namely if the determination result is affirmative, the determination control unit 14 controls the light emission control unit 2 in such a manner as to cause the light source unit 1 to emit light in an amount larger than the relatively small amount. In the following description, the mode in which the light source unit 1 is caused to emit a relatively small amount of light will be referred to as "low power consumption mode" and the mode in which the light source unit 1 is caused to emit a relatively large amount of light will be referred to as "normal mode".

The determination control unit 14 calculates an inter-frame difference of the first image, the second image or the differential image. If the number of pixels having a pixel value difference equal to or larger than a specified reference value exceeds a predetermined number, the determination control unit 14 determines that the target object (the motor vehicle AM) has entered the monitoring region X. If the number of pixels becomes equal to or smaller than the predetermined number, the determination control unit 14 determines that the target object (the motor vehicle AM) has left the monitoring region X.

If the determination result is negative (namely, if the number of pixels having the pixel value difference equal to or larger than the specified reference value is equal to or smaller than the predetermined number), the determination control unit 14 controls the light emission control unit 2 so as to reduce the amount of electric power supplied to the light source unit 1, thereby energizing the light source unit 1 in the low power consumption mode. If the determination result is affirmative, the automatic exposure adjustment processing is performed so that the light emission control unit 2 can energize the light source unit 1 in the normal mode. The light emission amount of the light source unit 1 in the low power consumption mode is set smaller than the light emission amount of the light source unit 1 in the normal mode, which is adjusted by the automatic exposure adjustment processing.

Figure 13:
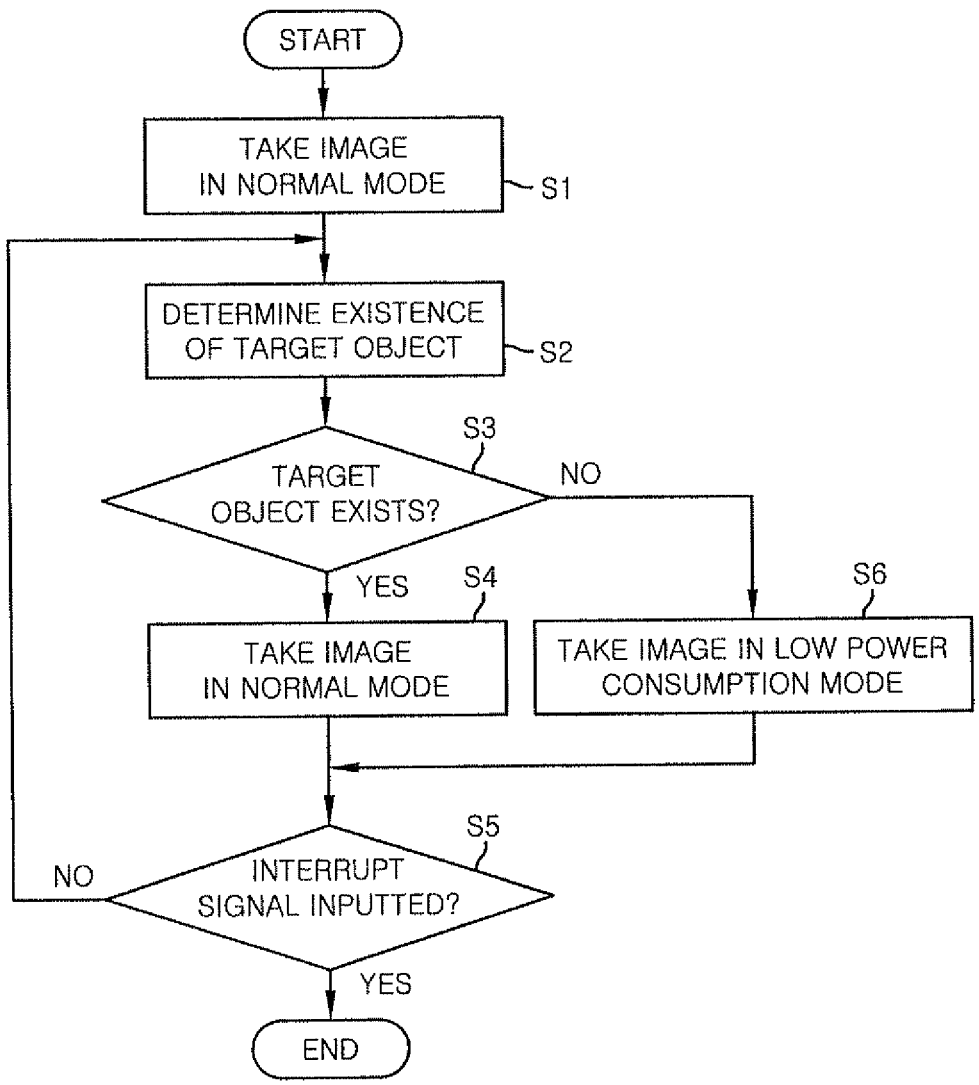
FIG. 13 is a flowchart for explaining the operation of the imaging apparatus of the third embodiment.

Next, the operation of the imaging apparatus A6 of the present embodiment will be described with reference to the flowchart shown in FIG. 13. If the imaging apparatus begins to operate by the supply of electric power, the determination control unit 14 starts the imaging operation in the normal mode (step S1). Then, the determination control unit 14 determines whether the target object (the motor vehicle AM) exists in the monitoring region X, namely whether the target object (the motor vehicle AM) is included in the initially taken image (the first image, the second image or the differential image) (step S2). If the determination result is affirmative, namely if the target object (the motor vehicle AM) exists in the monitoring region X (if "yes" in step S3), the determination control unit 14 continues to perform the imaging operation in the normal mode (step S4).

On the other hand, if the determination result is negative, namely if the object (the motor vehicle AM) does not exist in the monitoring region X (if "no" in step S3), the determination control unit 14 performs the imaging operation in the low power consumption mode (step S6). Then, the determination control unit 14 determines whether an interrupt signal commanding the stop of the imaging operation is inputted from the outside (step S5). If the interrupt signal is inputted, the determination control unit 14 terminates the imaging operation. If the interrupt signal is not inputted, the flow returns back to step S2 where the determination control unit 14 determines the existence and absence of the target object.

With the present embodiment described above, if the determination result of the target existence determining means (the determination control unit 14) is negative, namely if the target object (the motor vehicle AM) is not included in the first image, the second image or the differential image, the control means (the determination control unit 14) controls the light irradiation means (the light source unit 1) and the light emission control unit 2 to energize the light sources (the light source unit 1) in the low power consumption mode. It is therefore possible to reduce the power consumption and to prolong the lifespan of the light sources (the light source unit 1) while imaging the target object (the motor vehicle AM) going in and out of the target region (the monitoring region X).

There is a case that the determination control unit 14 performs a target object existence determining process on the second image when the ambient light in the monitoring region X is sufficiently strong (as in the outdoor at the daytime in the fine weather). In this case, if the determination result is negative and if the pixel values of at least some of the pixels of the second image are equal to or larger than a specified threshold value, the determination control unit 14 may control the light emission control unit 2 so as not to energize the light source unit 1.

In other words, if the existence of the target object (the motor vehicle AM) can be determined using the second image, the light source unit 1 may be kept turned off in the low power consumption mode. This provides an advantage in that it becomes possible to further reduce the power consumption and to further prolong the lifespan of the light source unit 1.

As to a method for energize the light source unit 1 in the low power consumption mode, the light emission control unit 2 may not only reduce the amount of electric power supplied to the light source unit 1 as set forth above but also set the irradiation time period in the low power consumption mode shorter than the irradiation time period in the normal mode. Instead of shortening the irradiation time period, it may be possible to adjust the light emission amount of the light source unit 1 in the low power consumption mode depending on the pixel values of at least some of the pixels of the first image.

For example, the light emission amount of the light source unit 1 is kept relatively low if the ambient light other than the light generated by the light source unit 1 is strong. The light emission amount of the light source unit 1 is kept relatively high if the ambient light is weak. This makes it possible to reduce the power consumption and to prolong the lifespan of the light source unit 1 while maintaining the quality of the first image.

Figure 14A:
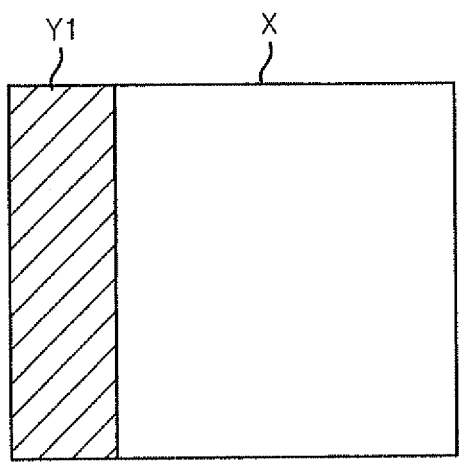
FIGS. 14A and 14B are views for explaining the operation of the imaging apparatus of the third embodiment.

Alternatively, at least some of the light sources (infrared emission diodes) may be turned off in the low power consumption mode. In the low power consumption mode, if the passage area of the target object (the motor vehicle AM) going into the monitoring region X is known, some of the light sources may be turned on so that the left area Y1 of the monitoring region X can become an irradiation area as shown in FIG. 14A.

Figure 14B:
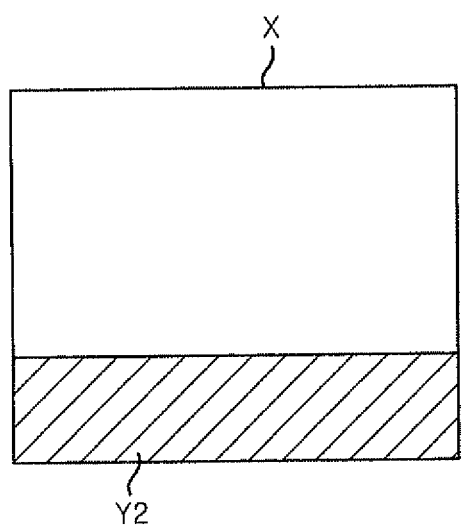

This provides an advantage in that, even if some of the light sources are kept turned off, it is possible to prevent reduction of the determination accuracy of the target object existence determining means (the determination control unit 14). If the lower area Y2 of the monitoring region X is used as the irradiation area as shown in FIG. 14B, it is possible to determine the existence of the target object regardless of whether the target object enters and exits at the left side or the right side (Fourth Embodiment)

Next, an imaging apparatus according to a fourth embodiment will be described with reference to FIGS. 15 through 18. In describing the imaging apparatus of the fourth embodiment, components identical with those of the preceding embodiments will be designated by like reference symbols with no repeated description made thereon.

Figure 15:
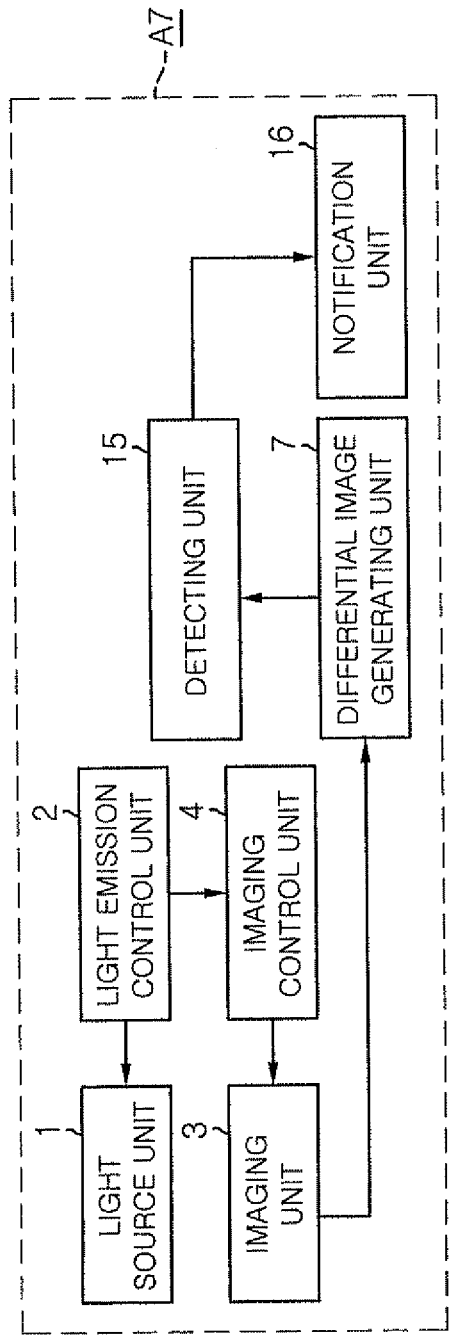
FIG. 15 is a block diagram showing an imaging apparatus according to a fourth embodiment of the present invention.

As shown in FIG. 15, the imaging apparatus (monitoring camera) A7 of the present embodiment includes a light source unit 1 for energizing light sources to irradiate light on a target region, a light emission control unit 2 for supplying electric power to the light source unit 1 to energize the light sources, an imaging unit 3 having an imaging element (two-dimensional CCD image sensor) (not shown) and a lens (not shown) for condensing the light on the light receiving surface of the imaging element, and an imaging control unit 4 for controlling the imaging unit 3 to take an image.

Further, the imaging apparatus A7 includes an image generating unit 7 for generating a differential image between a first image taken by the imaging unit 3 under the control of the imaging control unit 4 in synchronism with the irradiation time period during which the light is irradiated from the light source unit 1 and a second image taken by the imaging unit 3 under the control of the imaging control unit 4 during the time period other than the irradiation time period, a detecting unit 15 for detecting a reduction in the amount of light received by the imaging unit 3 (the received light amount) and a notification unit 16 for notifying a user of the fact that the decrement of the received light amount has exceeded a specified upper limit value. In this regard, the light source unit 1 may be provided independently of the imaging apparatus.

The light source unit 1 includes a plurality of infrared emission diodes (not shown) as light sources arranged in rows and columns. The light emission control unit 2 outputs, e.g., a modulation signal of extremely high frequency (e.g., 10 MHz) to the infrared emission diodes of the light source unit 1, thereby causing the infrared emission diodes to irradiate infrared light (modulation light) on the target region. The imaging control unit 4 causes the imaging unit 3 to take the first image and the second image in synchronism with the modulation signal outputted from the light emission control unit 2.

The detecting unit 15 is mainly composed of a microcomputer. The detecting unit 15 compares a detection target differential image with a standard differential image taken prior to the detection target differential image in a state that a target object (i.e., a motor vehicle) does not exist, whereby the detecting unit 15 detects reduction of the received light amount in the detection target differential image.

More specifically, the detecting unit 15 calculates a frequency distribution on the pixel values of the whole pixels of the differential image taken in advance (the standard differential image). The frequency distribution thus obtained is recorded in a memory. Then, the detecting unit 15 calculates the frequency distribution on the pixel values of the whole pixels of the detection target differential images periodically (e.g., every one or more weeks or every one or more months) selected from the differential images taken in operation.

For example, if the pixel values of the differential image range from 0 to 255, the detecting unit 15 may divide the entire range into sixteen classes (e.g., 0-15, 16-31, 32-47, 48-63, . . . , 224-239 and 240-255 and calculate the frequency distribution of the sixteen classes (see FIG. 16). Then the detecting unit 15 compares the class having the highest frequency in the frequency distribution of the standard differential image recorded in the memory with the class having the highest frequency in the frequency distribution of the detection target differential image. The detecting unit 15 detects reduction of the received light amount based on the difference between the classes.

In other words, if the amount of light received by the imaging element of the imaging unit 3 is reduced due to the influence of contaminants or scratches adhering to or generated in the lens (not shown) of the imaging unit 3 or the transparent cover (not shown) for protecting the imaging unit 3 or due to the influence of emission amount reduction caused by the aging deterioration of the light sources (infrared emission diodes) of the light source unit 1, the pixel values of the respective pixels of the detection target differential image are also reduced. As a result, the class having the highest frequency in the frequency distribution of the differential image is changed (shifted to the class having a relatively small pixel value). This makes it possible to detect reduction of the received light amount based on the class difference between the standard differential image and the detection target differential image.

The detecting unit 15 uses the class difference as a parameter of the decrement of the received light amount. For example, if the class difference exceeds three classes, the detecting unit 15 regards the decrement as having exceeded the upper limit value and informs the notification unit 16 of this fact (see FIG. 15). The notification unit 16 notifies a user of the detection result of the detecting unit 15 by driving a buzzer to generate a notification sound or by turning on an indication lamp.

Upon becoming aware of the notification made by the notification unit 16, the user cleans the lens or the cover, replaces the scratched lens or the scratched cover with a new one, or replaces the light sources undergoing severe aging deterioration with new ones. This makes it possible to prevent reduction of the quality of the differential image taken after the cleaning or replacing operation.

The detecting method performed by the detecting unit 15 is not limited to the one described above. As an alternative example, the number of pixels having pixel values equal to or larger than a specified threshold value may be used as a parameter of the decrement of the received light amount. The number of pixels of the standard differential image having pixel values equal to or larger than the threshold value is compared with the number of pixels of the detection target differential image having pixel values equal to or larger than the threshold value.

If the latter number of pixels is equal to or less than, e.g., 70% of the former number of pixels, the detecting unit 15 regards the decrement as having exceeded the upper limit value and informs the notification unit 16 of this fact. Alternatively, the differential values between the pixels of the standard differential image and the pixels of the detection target differential image may be accumulated. If the accumulated differential values exceed a specified value, the detecting unit 15 regards the decrement as having exceeded the upper limit value and informs the notification unit 16 of this fact.

Figure 17:
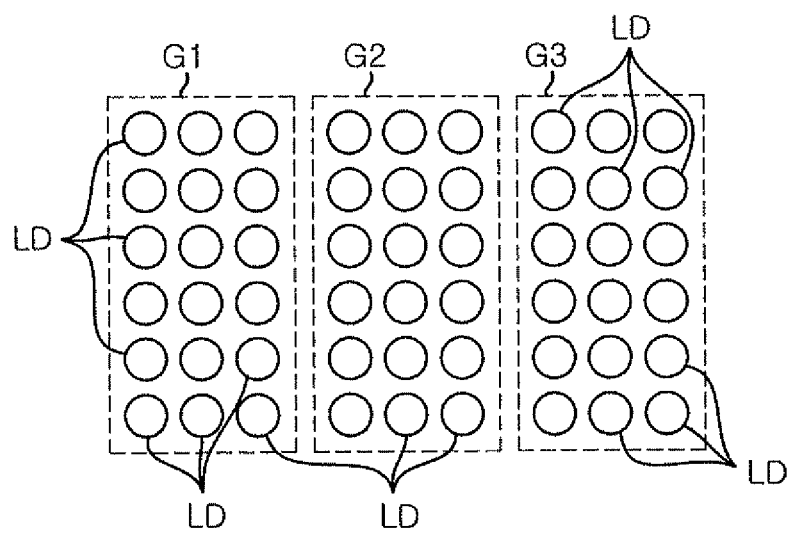
FIG. 17 is a schematic configuration view showing a light source unit of the imaging apparatus of the fourth embodiment.

As shown in FIG. 17, a plurality of infrared emission diodes LD making up the light source unit 1 are arranged in rows and columns. The infrared emission diodes LD are divided into a plurality of (three, in the illustrated example) groups G1, G2 and G3. Standard differential images and detection target differential images are acquired by energizing the groups G1, G2 and G3 on a group-by-group basis. This makes it possible to detect reduction of the received light amount in respect of the light sources (infrared emission diodes LD) belonging to the respective groups G1, G2 and G3 and in respect of the portions of the lens or the cover, namely the contaminant-adhering portions or the scratched portions, corresponding to the respective groups G1, G2 and G3.

Figure 18:
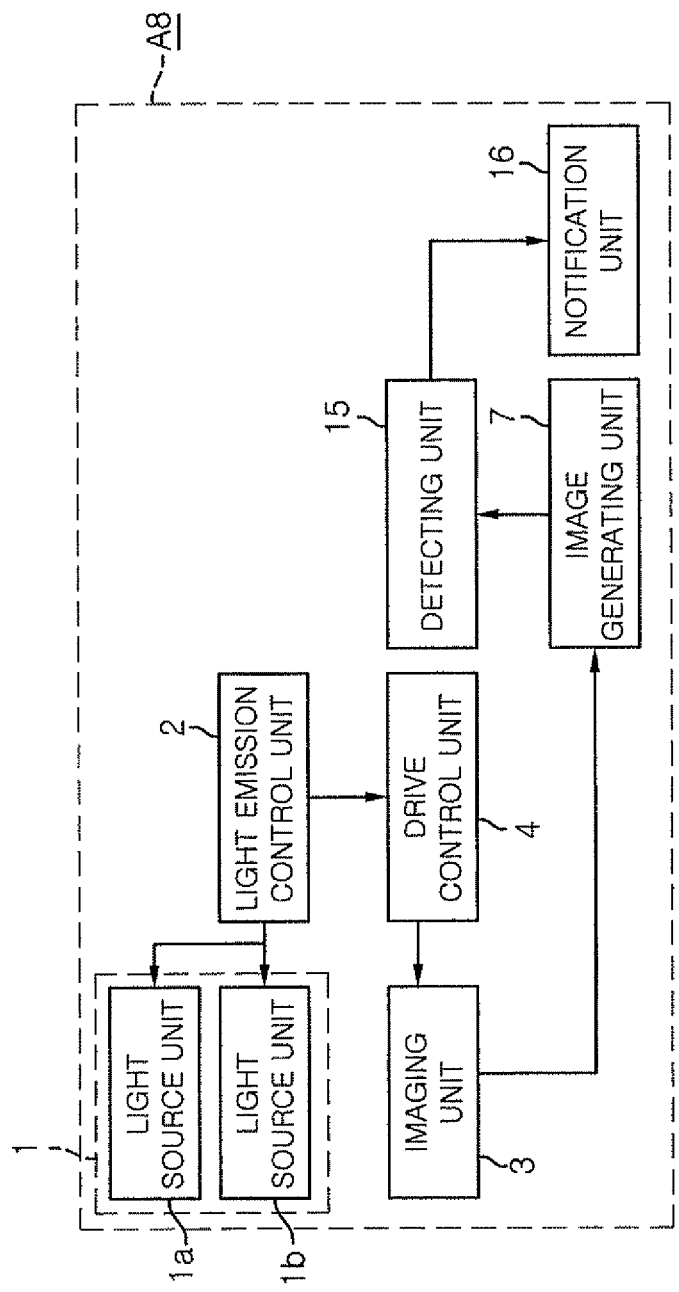
FIG. 18 is a block diagram showing another example of the imaging apparatus of the fourth embodiment.

As shown in FIG. 18, the imaging apparatus A8 may include a plurality of (two, in the illustrated example) light source units 1a and 1b. In this case, differential images between standard differential images and detection target differential images are acquired by independently energizing the light source units 1a and 1b. Accordingly, it is possible to detect reduction of the received light amount in respect of each of the light source units 1a and 1b and in respect of each of the portions of the lens or the cover, namely the contaminant-adhering portions or the scratched portions, corresponding to the respective light source units 1a and 1b.

In case of detecting reduction of the received light amount caused by the aging deterioration of the light source unit 1, it is preferable to acquire the standard differential image and the detection target differential image at the time when the influence of the ambient light other than the light (infrared light) generated by the light source unit 1 is reduced. Therefore, it is preferred that the differential images taken in the time period during which the ambient light becomes constant, namely at the nighttime, rather than the daytime during which the influence of the ambient light (especially, the sunlight) is increased, are used as the standard differential image and the detection target differential image. It the standard differential image and the detection target differential image are acquired at the nighttime in this manner, there is provided an advantage in that it becomes possible to enhance the detection accuracy of the detecting unit 15.

(Fifth Embodiment)

Next, an imaging apparatus according to a fifth embodiment will be described with reference to FIGS. 19 through 24. In describing the imaging apparatus of the fifth embodiment, components identical with or similar to those of the preceding embodiments will be designated by like reference symbols with no repeated description made thereon.

Figure 19:
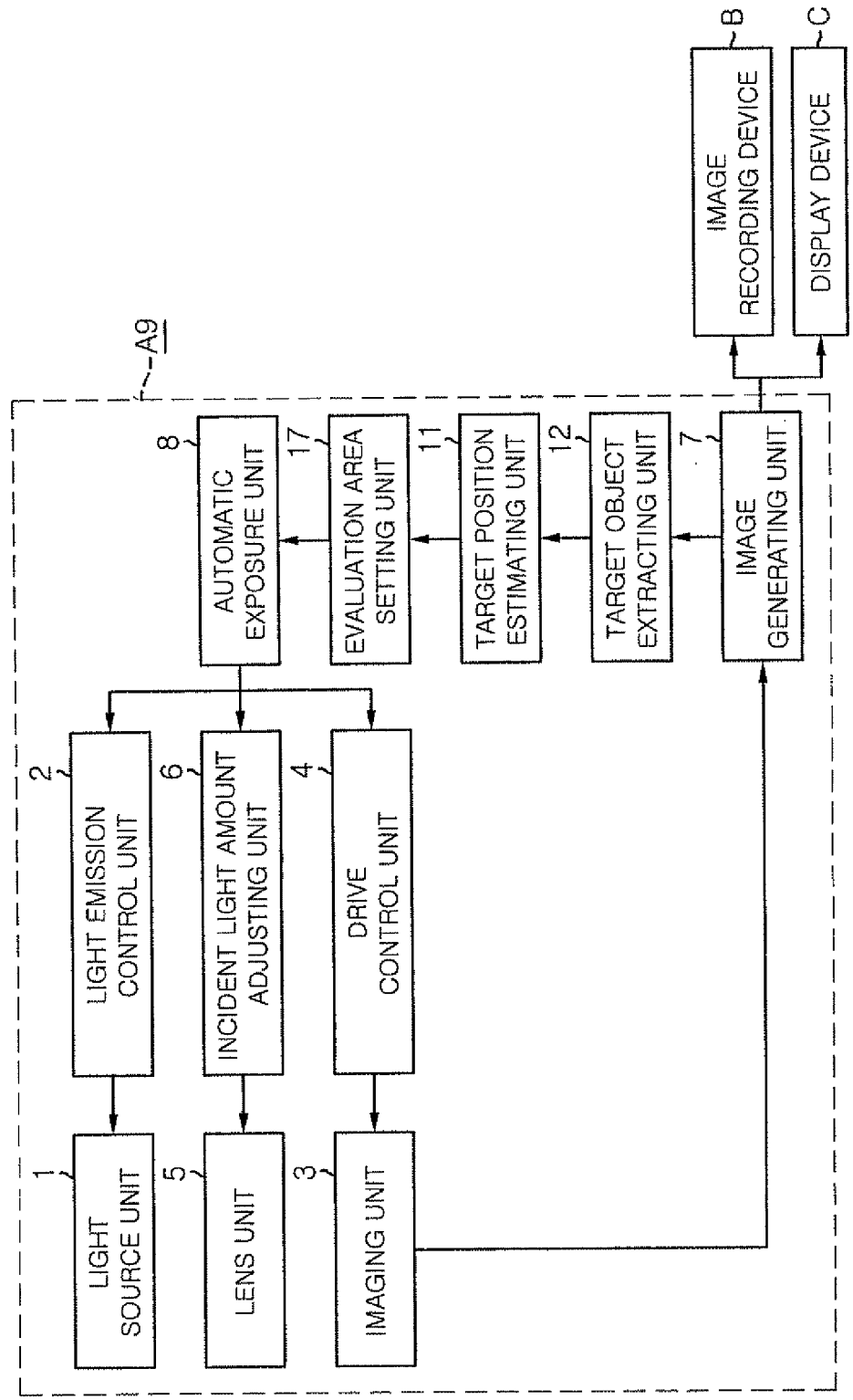
FIG. 19 is a block diagram showing an imaging apparatus according to a fifth embodiment of the present invention.

As shown in FIG. 19, the imaging apparatus A9 of the present embodiment includes a light source unit 1 for irradiating infrared light on a target region (vehicle traveling lane), the light source unit 1 having a plurality of infrared emission diodes arranged in a matrix pattern, a light emission control unit 2 for supplying an electric current to the infrared emission diodes of the light source unit 1 to energize the infrared emission diodes, and an imaging unit 3 having an imaging element sensitive to the infrared light. Further, the imaging apparatus A9 includes a drive control unit 4 for driving and controlling the imaging unit 3, a lens unit 5 for condensing the light on the imaging element, and an incident light amount adjusting unit 6 for adjusting the amount of light incident on the imaging unit 3 by controlling a diaphragm of the lens unit 5.

Furthermore, the imaging apparatus A9 includes an image generating unit 7 for generating a differential image (light modulation image) between a first image (emission image) taken by the imaging unit 3 in synchronism with the irradiation time period during which the infrared light is irradiated from the light source unit 1 and a second image (non-emission image) taken by the imaging unit 3 during the time period other than the irradiation time period. The differential image generated by the image generating unit 7 is outputted to an external image recording device B and a display device C. The differential image is recorded in the image recording device B and is displayed on the display device C.

The light emission control unit 2 outputs, e.g., a modulation signal of extremely high frequency (e.g., 10 MHz) to the infrared emission diodes of the light source unit 1, thereby causing the infrared emission diodes to irradiate modulation light on the target region in which a target object (motor vehicle) exists. The light emission control unit 2 controls the amount of the modulation light by increasing or decreasing the electric current flowing through the infrared emission diodes.

The incident light amount adjusting unit 6 adjusts the amount of the light incident on the imaging element of the imaging unit 3 through the diaphragm by regulating the opening degree of the diaphragm. In synchronism with the emission time period of the infrared emission diodes pursuant to the modulation signal of the light emission control unit 2, the drive control unit 4 outputs the first and second images to the image generating unit 7 during the irradiation time period during which the modulation light is irradiated and during the non-irradiation time period during which the modulation light is not irradiated. The reflected light components of the light received by the imaging element of the imaging unit 3 are used as pixel values in the first and second images.

The imaging apparatus A9 of the present embodiment further includes an automatic exposure unit 8 for evaluating an exposure amount from the pixel values of the whole pixels included in a partial area (evaluation area) of the differential image and adjusting the light emission amount of the light source unit 1 by controlling light emission control unit 2 so that the exposure amount (pixel values) can fall within a specified proper range or for adjusting the exposure amount by controlling the incident light amount adjusting unit 6 so as to adjust the diaphragm.

The imaging apparatus A9 of the present embodiment further includes an evaluation area setting unit 17 for setting an area at least partially overlapping with the target object moving through the target region as an evaluation area. For example, if the target object is a motor vehicle, particularly a driver of the motor vehicle, it is preferred that the area including the windshield of the motor vehicle be set as the evaluation area. In case where the motor vehicle is moving, the position of the motor vehicle in the image (differential image) is changed over time. Therefore, it is likely that the evaluation area is deviated from the target object (the windshield of the motor vehicle).

In the present embodiment, the evaluation area setting unit 17 is configured to, based on the target object position information, set an evaluation area when taking a differential image of the next frame. In order to acquire the target object position information, the imaging apparatus A9 includes a target object extracting unit 12 for extracting the target object (the motor vehicle) from the differential image generated by the image generating unit 7 and a target position estimating unit 11 for estimating the position of the target object extracted by the target object extracting unit 12.

As described in respect of FIG. 2, the target object extracting unit 12 calculates the differences (time-dependent variations) of the pixel values of the whole pixels with respect to the differential images of multiple frames continuously generated by the image generating unit 7. The target object extracting unit 12 extracts, as the target object, the pixel group having the differences equal to or greater than a predetermined threshold value.

Herein, it is assumed that a motor vehicle M, i.e., a target object, moves (travels) toward a gate G along a lane L (from the right upper side toward the left lower side in FIG. 2). If the travel speed of the motor vehicle M is known, it is possible to estimate the position of a motor vehicle Mn+1 imaged in the next n+1 frame. Accordingly, the target position estimating unit 11 calculates the moving speed (travel speed) based on the inter-frame displacement amount of the positions of the target objects (the motor vehicle Mn−1 and the motor vehicle Mn) extracted by the target object extracting unit 12. Based on the moving speed, the target position estimating unit 11 estimates the position of the target object (the motor vehicle Mn+1) in the next frame (the n+1 frame) (see the broken line in FIG. 2C).

The target position estimating unit 11 transmits the estimation result (the target object position information) to the evaluation area setting unit 17. In case where the moving (traveling) direction of the motor vehicle M as the target object is not known in advance, the target position estimating unit 11 estimates the moving direction from, e.g., the positional relationship between the motor vehicle M−1 and the motor vehicle M. The target position estimating unit 11 estimates the next n+1 position using the estimated moving direction and the travel speed of the motor vehicle M. The target position estimating unit 11 transmits the estimation result to the evaluation area setting unit 17.

Based on the target object position information acquired from the target position estimating unit 11, the evaluation area setting unit 17 sets the range including the target object (especially, the windshield of the motor vehicle Mn+1) as an evaluation area X (see FIG. 2C). The setting information on the evaluation area X set by the evaluation area setting unit 17 (the range of the evaluation area X) is sent to the automatic exposure unit 8. The automatic exposure unit 8 evaluates an exposure amount from the pixel values of the whole pixels included in the evaluation area X and performs exposure control so that the exposure amount can fall within a specified proper range.

With the imaging apparatus A9 of the present embodiment, the evaluation area setting unit 17 sets the evaluation area X for use in taking the differential image of the next frame, based on the target object position information of the next frame estimated by the position estimating means (the target object extracting unit 12 and the target position estimating unit 11). It is therefore possible to properly evaluate the exposure amount even if the subject (target object) is moving. In this regard, the position estimating means may sequentially estimate the target object position from the differential images of multiple consecutive frames. Based on the target object position information, the evaluation area setting unit 17 may set the evaluation area on a frame-by-frame basis.

(First Modified Example of the Fifth Embodiment)

Figure 20:
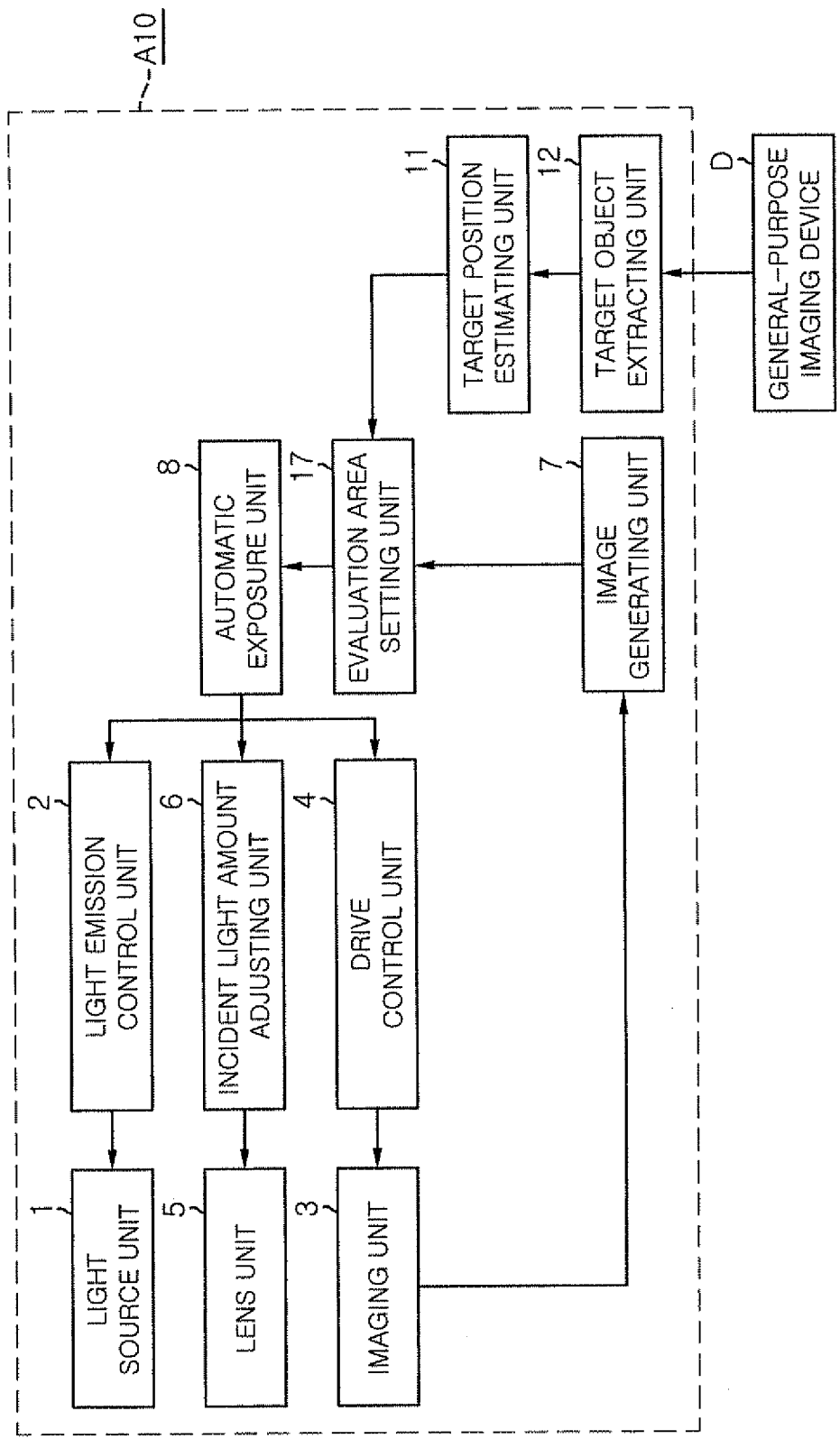
FIG. 20 is a block diagram showing an imaging apparatus according to a first modified example of the fifth embodiment of the present invention.

Referring to FIG. 20, the imaging apparatus A10 according to a first modified example of the fifth embodiment is characterized in that the target object extracting unit 12 extracts the target object (the motor vehicle) not from the differential image generated by the image generating unit 7 but from the image taken by an external general-purpose imaging device D. The basic configuration of the imaging apparatus A10 of the present modified example remains the same as the configuration of the imaging apparatus A9 of the fifth embodiment. Identical components will be designated by like reference symbols with illustration and description thereon omitted appropriately.

The general-purpose imaging device D is, e.g., a commercially-available general-purpose CCD camera, and is configured to image a target region substantially at the same view angle as the view angle of the imaging apparatus A10. The image taken by the general-purpose imaging device D is outputted to the target object extracting unit 12.

Just like the fifth embodiment, the target object extracting unit 12 calculates the differences (time-dependent variations) of the pixel values of the whole pixels with respect to the images of multiple frames continuously taken by the general-purpose imaging device D. The pixel group having the differences equal to or greater than a predetermined threshold value is extracted as a target object. The processing performed by the target position estimating unit 11 and the evaluation area setting unit 17 remains the same as that of the fifth embodiment. Therefore, no description will be made thereon.

In the imaging apparatus A10 of the present modified example, just like the imaging apparatus A9 of the fifth embodiment, the evaluation area setting unit 17 sets the evaluation area X for use in taking the differential image of the next frame, based on the target object position information of the next frame estimated by the position estimating means (the target object extracting unit 12 and the target position estimating unit 11). It is therefore possible to properly evaluate the exposure amount even if the subject (target object) is moving.

Alternatively, the position estimating means may sequentially estimate the target object position from the images of multiple frames taken by the general-purpose imaging device D. Based on the target object position information, the evaluation area setting unit 17 may set the evaluation area on a frame-by-frame basis.

(Second Modified Example of the Fifth Embodiment)

Figure 21:
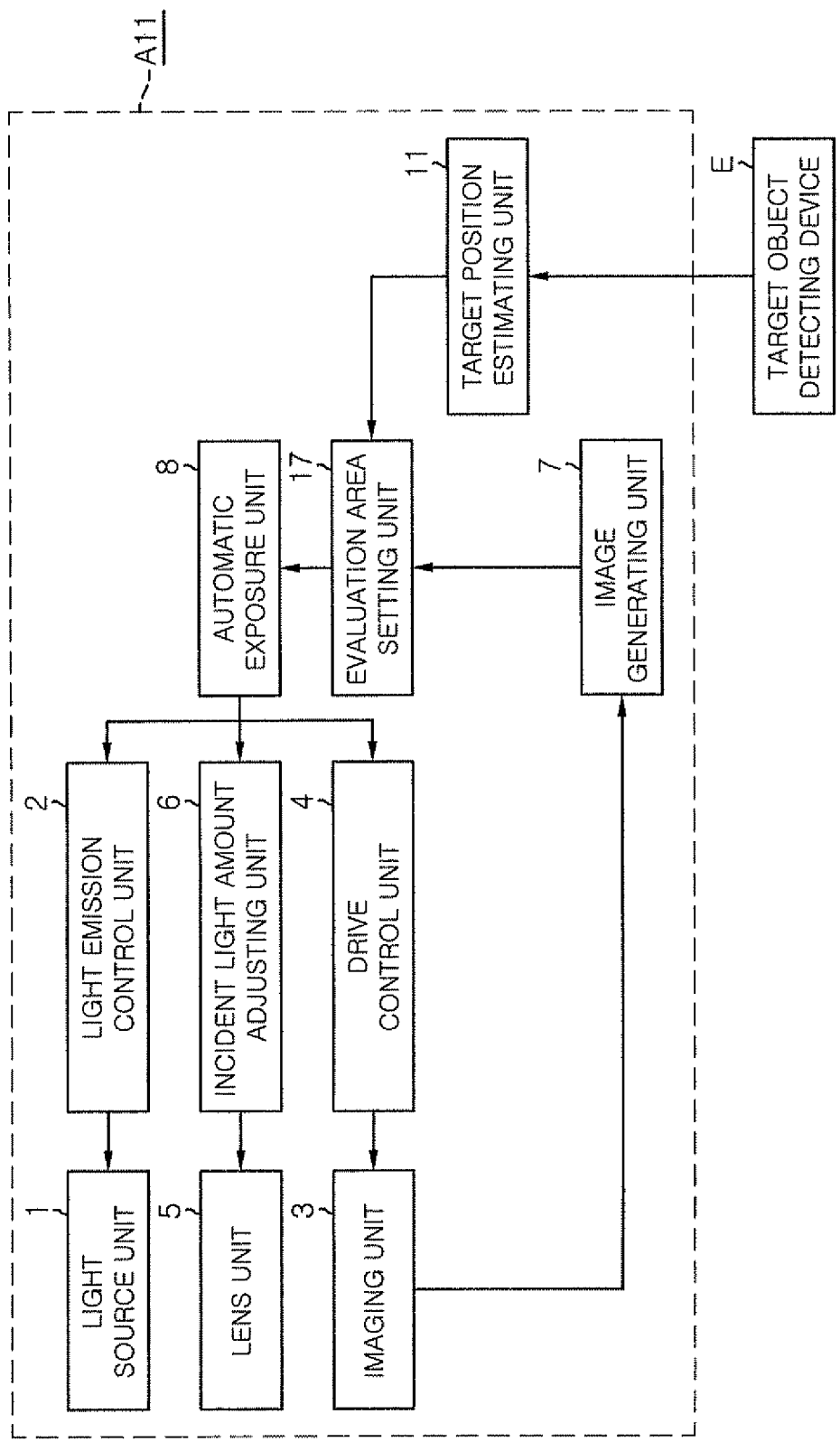
FIG. 21 is a block diagram showing an imaging apparatus according to a second modified example of the fifth embodiment of the present invention.

Referring to FIG. 21, the imaging apparatus A11 according to a second modified example of the fifth embodiment is characterized in that the target position estimating unit 11 estimates the target object position in the differential image of the next frame based on the target object position detected by a target object detecting device E instead of the target object position extracted by the target object extracting unit 12. The basic configuration of the imaging apparatus A11 of the present modified example remains the same as the configuration of the imaging apparatus A9 of the fifth embodiment. Identical components will be designated by like reference symbols with illustration and description thereon omitted appropriately.

The target object detecting device E transmits, e.g., electric waves or ultrasonic waves along a lane L and receives the reflected waves coming back from a motor vehicle as a target object, thereby detecting the distance to the motor vehicle and the travel speed of the motor vehicle. The target object detecting device E outputs the detection results (the position and travel speed of the motor vehicle) to the target position estimating unit 11 of the imaging apparatus A11.

Based on the information on the position of the target object (the motor vehicle) (the position and travel speed of the motor vehicle) acquired from the target object detecting device E, the target position estimating unit 11 estimates the target object position at the time when taking the differential image of the next frame and outputs the estimation result to the evaluation area setting unit 17. The processing performed by the evaluation area setting unit 17 remains the same as that of the fifth embodiment. Therefore, no description will be made thereon.

In the imaging apparatus A11 of the present modified example, just like the imaging apparatuses A9 and A10 of the fifth embodiment and the first modified example thereof, the evaluation area setting unit 17 sets the evaluation area X for use in taking the differential image of the next frame, based on the target object position information of the next frame estimated by the position estimating means (the target position estimating unit 11). It is therefore possible to properly evaluate the exposure amount even if the subject (target object) is moving. Alternatively, the target position estimating unit 11 may sequentially estimate the target object position based on the position and travel speed of the target object detected by the target object detecting device E. Based on the target object position information, the evaluation area setting unit 17 may set the evaluation area on a frame-by-frame basis.

(Third Modified Example of the Fifth Embodiment)

Figure 22:
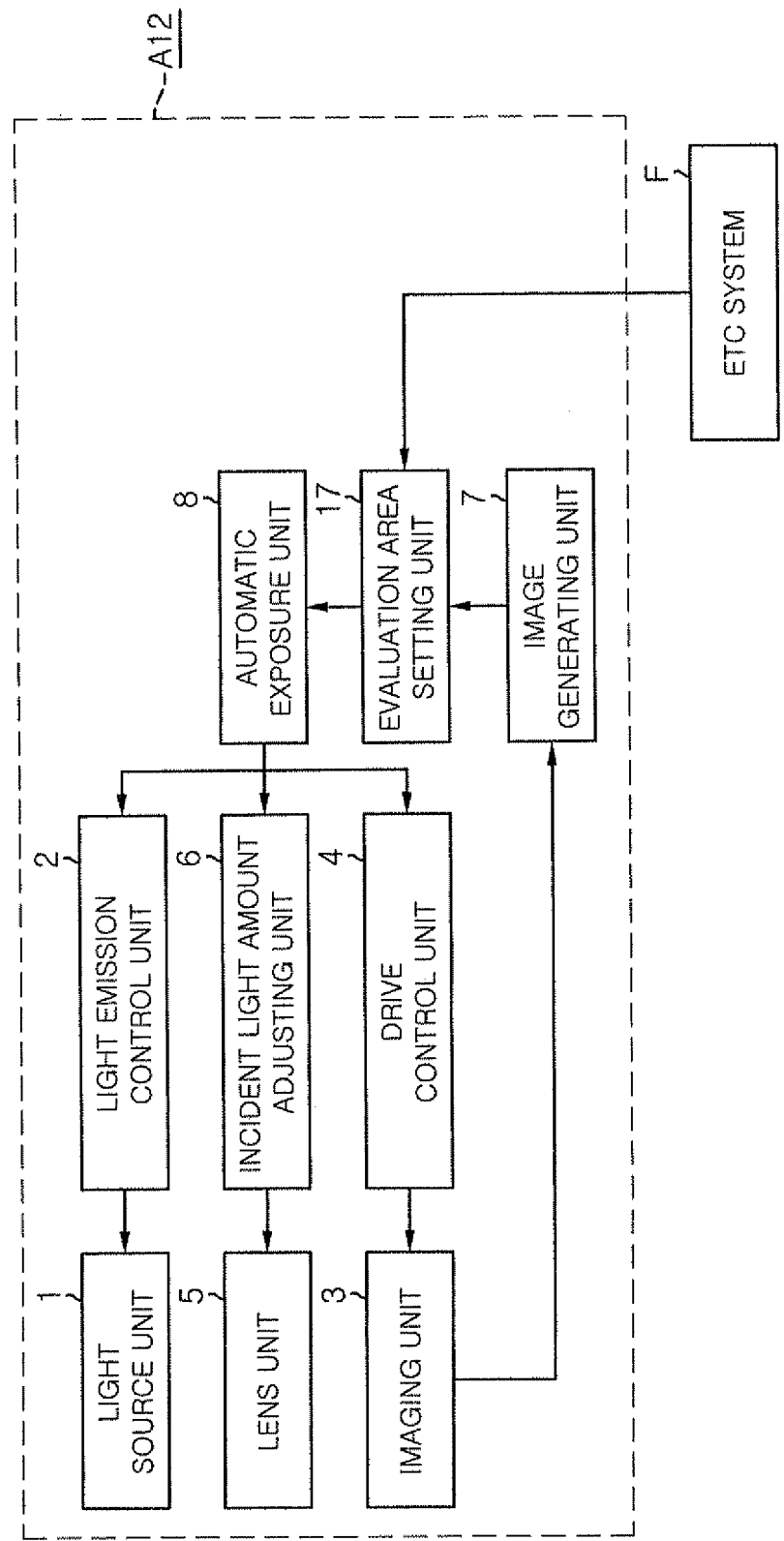
FIG. 22 is a block diagram showing an imaging apparatus according to a third modified example of the fifth embodiment of the present invention.

Referring to FIG. 22, the imaging apparatus A12 according to a third modified example of the fifth embodiment is characterized in that the evaluation area setting unit 17 sets the evaluation area based on the information on the target object (the motor vehicle) received from an external system (e.g., an ETC system F). The basic configuration of the imaging apparatus A12 of the present modified example remains the same as the configuration of the imaging apparatus A9 of the fifth embodiment. Identical components will be designated by like reference symbols with illustration and description thereon omitted appropriately.

The ETC system F acquires, through wireless communications, the information set up in a on-board device mounted on the motor vehicle, more particularly the vehicle information written on a vehicle inspection certificate, e.g., the vehicle body type (such as a box type, a station wagon type or a truck type) and the vehicle dimension (such as a total length, a total width or a total height). In the imaging apparatus A12 of the present modified example, the evaluation area setting unit 17 acquires the vehicle information obtained by the ETC system F from the motor vehicle as the target object. Based on the vehicle information thus acquired, the evaluation area setting unit 17 sets an evaluation area.

More specifically, the height of a driver's seat is largely changed depending on the kinds of the motor vehicle, namely depending on whether the motor vehicle is an ordinary car or a large-size car (such as a bus or a truck). It is therefore necessary to set the evaluation area so as to overlap with the driver's seat according to the vehicle kind.

Figure 23A:
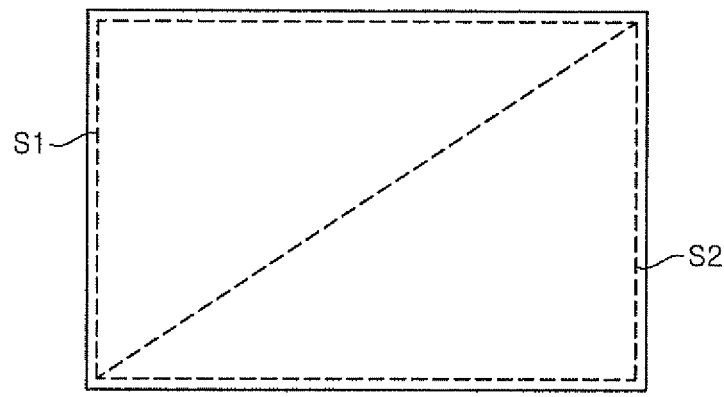
FIGS. 23A and 23B are views for explaining the operation of the imaging apparatus of the third modified example of the fifth embodiment.

In the imaging apparatus A12 of the present modified example, as shown in FIG. 23A, the imaging area is divided into two regions S1 and S2 by a diagonal line. Based on the vehicle information acquired from the ETC system F, the evaluation area setting unit 17 sets the region S1 above the diagonal line as an evaluation area if the motor vehicle is a large-size car. The evaluation area setting unit 17 sets the region S2 below the diagonal line as an evaluation area if the motor vehicle is an ordinary car.

Figure 23B:
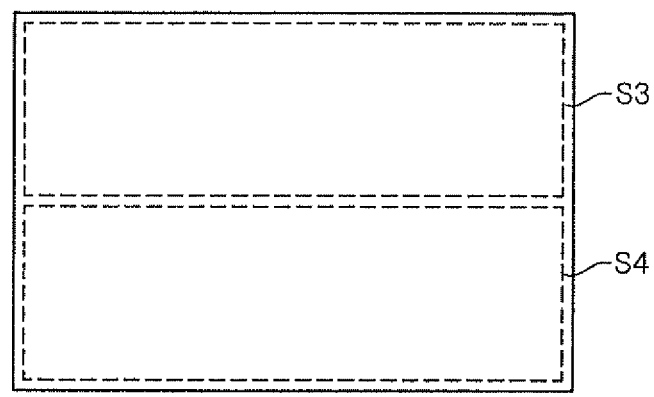

Alternatively, as shown in FIG. 23B, the imaging area may be divided into a plurality of regions, e.g., S3 and S4 along the vertical direction. The evaluation area setting unit 17 sets the upper region S3 as an evaluation area if the motor vehicle is a large-size car. The evaluation area setting unit 17 sets the lower region S4 as an evaluation area if the motor vehicle is an ordinary car.

The imaging apparatus A12 of the present modified example uses the body size of the motor vehicle (the vehicle kind) as the target object position information and sets the evaluation area so as to overlap with the driver's seat of the motor vehicle even when the position of the driver's seat is changed depending on the body size. This makes it possible to properly set the evaluation area depending on the vehicle kind.

(Fourth Modified Example of the Fifth Embodiment)

In the meantime, if the distance from the imaging apparatus An (n=9, 10, 11 or 12) to the motor vehicle as the target object is shorter than a specified imaging distance, the exposure amount adjusted by the automatic exposure unit 8 becomes too large. Thus, it is sometimes the case that the imaging element of the imaging unit 3 gets saturated.

In a fourth modified example of the fifth embodiment, if the estimated position of the target object in the next frame lies in a range shorter than a specified imaging distance, the automatic exposure unit 8 of the imaging apparatus An of one of the fifth embodiment and the first and second modified examples thereof serving as an exposure amount adjusting means subtracts a specified value (offset value) from the exposure amount of the frame just prior to the next frame, thereby deciding the exposure amount in the next frame. The basic configuration of the imaging apparatus of the present modified example remains the same as the configuration of the imaging apparatus An of one of the fifth embodiment and the first and second modified examples thereof. Therefore, illustration and description on the same components will be omitted.

Next, the operation of the automatic exposure unit 8 of the present modified example will be described with reference to the flowchart shown in FIG. 24.

If the evaluation area of the next frame is completely set by the evaluation area setting unit 17 (step S1), the automatic exposure unit 8 estimates the distance to the target object (the motor vehicle) in the next frame based on the target object position information (step S2) and compares the estimated distance value with a specified threshold value (step S3).

If the estimated distance value is smaller than the specified threshold value (if "yes" in step S3), namely if the estimated target object position in the next frame lies in a range shorter than the specified imaging distance, the automatic exposure unit 8 sets the offset value to become W (>0) (step S4). If the estimated distance value is equal to or larger than the specified threshold value (if "no" in step S3), the automatic exposure unit 8 sets the offset value to become zero (step S5).

The automatic exposure unit 8 evaluates the exposure amount of the previous frame (step S6) and subtracts the offset value from the evaluated exposure amount, thereby deciding the exposure amount of the next frame (step S7). The automatic exposure unit 8 performs exposure control using the exposure amount thus decided (step S8).

With the imaging apparatus of the present modified example, it is possible to prevent the imaging element of the imaging unit 3 from getting saturated when the distance from the imaging apparatus An (n=9, 10, 11 or 12) to the motor vehicle as the target object is short.

While certain preferred embodiments of the present invention have been described above, the present invention is not limited to these specific embodiments but may be modified or changed in many different forms without departing from the scope of the invention defined in the claims. Such modifications and changes shall be construed to fall within the scope of the present invention.

What is claimed is:

1. An imaging apparatus for taking a picture of a driver of a motor vehicle through a front glass of the motor vehicle, comprising:
    a light source unit which irradiates light on a target region;
    an image generating unit which generates a differential image between a first image taken in synchronism with an irradiation time period during which the light source unit irradiates the light and a second image taken in a time period other than the irradiation time period;
    a transmittance estimation unit which estimates a light transmittance of the front glass existing in the target region; and
    an exposure amount adjusting unit which adjusts an exposure amount based on an estimation result of the transmittance estimation unit such that the exposure amount of an image of the driver in the differential image falls within a specified proper range, wherein the transmittance estimation unit estimates the transmittance of the front glass from at least one of the first image, the second image and the differential image.

2. The imaging apparatus of claim 1, wherein the transmittance estimation unit stores in advance kinds of the motor vehicle object and the transmittance of the front glass corresponding to the respective kinds, and estimates the transmittance of the front glass by specifying the kind of the motor vehicle from at least one of the first image, the second image and the differential image.

3. The imaging apparatus of claim 2, wherein the transmittance estimation unit generates a time-dependent difference image by calculating an inter-frame difference of at least one of the first image, the second image and the differential image and specifies the kind of the motor vehicle by performing image processing with respect to the time-dependent difference image.

4. The imaging apparatus of claim 2, wherein the transmittance estimation unit generates a background difference image by calculating a background difference of at least one of the first image, the second image and the differential image and specifies the kind of the motor vehicle by performing image processing with respect to the background difference image.

5. The imaging apparatus of claim 2, wherein the transmittance estimation unit extracts a characterizing part of the motor vehicle from at least one of the first image, the second image and the differential image and specifies the kind of the motor vehicle by performing image processing with respect to the characterizing part.

6. The imaging apparatus of claim 2, wherein the transmittance estimation unit specifies the kind of the motor vehicle by performing image processing with respect to a partial region of at least one of the first image, the second image and the differential image.

7. The imaging apparatus of claim 6, wherein the transmittance estimation unit has a region setting mode for setting the partial region, in which the partial region is set with respect to an image taken in a situation that the motor vehicle does not exist in the target region.

8. The imaging apparatus of claim 1, wherein the light source unit adjusts at least one of an irradiation range and an amount of the light when taking the first image used in estimating the transmittance of the front glass.

9. The imaging apparatus of claim 1, wherein the exposure amount adjusting unit controls the light source unit to reduce an irradiation range of the light based on the estimation result of the transmittance estimation unit.

10. The imaging apparatus of claim 1, wherein the transmittance estimation unit extracts a characterizing part of the motor vehicle from at least one of the first image, the second image and the differential image and estimates the transmittance of the front glass based on the pixel values of the characterizing part.

* * * * *